US006494469B1

(12) United States Patent
Hara et al.

(10) Patent No.: US 6,494,469 B1
(45) Date of Patent: Dec. 17, 2002

(54) ROLLING WALKER

(75) Inventors: Yasunori Hara, Ina (JP); Tsunetaro Ito, Ina (JP)

(73) Assignee: Takano Co., Ltd., Nagano (JP)

( * ) Notice: Subject to any disclaimer, the term of this patent is extended or adjusted under 35 U.S.C. 154(b) by 6 days.

(21) Appl. No.: 09/684,202

(22) Filed: Oct. 6, 2000

(30) Foreign Application Priority Data

Oct. 12, 1999 (JP) .......................................... 11-290255
Oct. 12, 1999 (JP) .......................................... 11-290288
Oct. 12, 1999 (JP) .......................................... 11-290304
Oct. 12, 1999 (JP) .......................................... 11-290305
Nov. 18, 1999 (JP) .......................................... 11-328407

(51) Int. Cl.[7] ................................................ B62M 1/00
(52) U.S. Cl. ........................... 280/87.041; 280/87.021; 135/67; 135/85
(58) Field of Search ....................... 280/87.021, 87.041, 280/650, 647; 135/67, 85, 66; 5/66.2, 503.1, 426; 297/93, 123, 283.2, 118, 5, 6; 224/42.32, 414, 47; 482/66–68; 403/322.2, 326, 327; 188/19, 20, 22

(56) References Cited

U.S. PATENT DOCUMENTS 4,510,956 A * 4/1985 King ........................... 135/67
4,759,098 A * 7/1988 Ko ................................ 16/29
5,279,180 A 1/1994 Henriksson
5,603,517 A * 2/1997 Lorman ...................... 280/5.2
5,772,234 A * 6/1998 Luo ........................... 280/642
5,927,441 A * 7/1999 Luo ............................ 188/19
5,988,670 A * 11/1999 Song et al. ................. 280/648
6,032,765 A * 3/2000 Hsi-Chia ..................... 188/19
6,099,002 A * 8/2000 Uchiyama .............. 280/87.021
6,311,708 B1 * 11/2001 Howle ......................... 135/67
6,318,392 B1 * 11/2001 Chen ........................... 135/67

FOREIGN PATENT DOCUMENTS

| | | | |
|---|---|---|---|
| JP | 55160604 | | 12/1980 |
| JP | 60-81066 | | 6/1985 |
| JP | 63-61601 | | 3/1988 |
| JP | 63-64503 | | 4/1988 |
| JP | 63-109131 | U | 7/1988 |
| JP | 2-48402 | | 4/1990 |
| JP | 6-38973 | U | 5/1994 |
| JP | 7500791 | | 1/1995 |
| JP | 7-35242 | A | 6/1995 |
| JP | 8-57005 | A | 5/1996 |
| JP | 3037972 | | 3/1997 |
| JP | 3047561 | | 1/1998 |
| JP | 3047562 | U | 1/1998 |
| JP | 10182545 | | 7/1998 |

* cited by examiner

*Primary Examiner*—Avraham Lerner
*Assistant Examiner*—Tony Winner
(74) *Attorney, Agent, or Firm*—Notaro & Michalos P.C.

(57) ABSTRACT

A rolling walker 1 comprises a first frame 3 supported by a front caster 2 at both ends thereof and a second frame 5 supported by a rear caster 4 at both ends thereof, and a handle 7 provided to either first frame 3 or second frame 5. The first frame 3 and the second frame 5 are foldably connected each other by a connecting shaft 6. The rolling walker 1 has a closed frame fixing means 11 which fixes the first frame 3 and the second frame 5 in a closed position and connects the first frame 3 and the second frame 5 to stand when the first frame 3 and the second frame 5 are rotationally folded around the connecting shaft 6, so that each frame 3, 5 can be kept folded to stand when the rolling walker 1 is not used. The rolling walker 1 also has a straight moving means 106 which fixes the front caster 2 in a back and front direction of the rolling walker 1 and the front caster 2 is a rotatable caster having the caster rotational axis CF around which the front caster 2 rotates so that all casters 2 and 4 can be fixed in a back and front direction, ensuring straightness in walking.

23 Claims, 30 Drawing Sheets

ROLLING WALKER

FIELD OF THE INVENTION

The present invention relates to a rolling walker. More particularly, the present invention relates to improvement of structure such as a frame and a seat of a rolling walker that can take various forms to be used, for example, an apparatus for enabling aged or disabled people to walk or to help them walk or as a walking trainer. It is noted that a term "rolling walker" is used in this specification as a general term for apparatuses having at least a frame, a caster and a handle particularly for helping aged people or disabled people to walk in order to walk easily, and is a concept including all kinds of lightweight cars called a walker, a walking trainer, a rolling walker for aged people or the like.

BACKGROUND OF THE INVENTION

Conventionally, there has been known a rolling walker 200 having cross-type frames of a first frame 201 and a second frame 202 connected with each other by a connecting shaft 208 so that the frames can be folded, as shown in FIGS. 29 and 30. The rolling walker is provided with a seat 205 and a handle (not shown) extending from either of the frames 201 or 202 and a user can sit on the seat 205 between the right and left handles only turning his or her body. Further, each frame 201, 202 is composed of longitudinal pipe portions disposed on both sides respectively and at least one lateral pipe portion connecting the longitudinal pipe portions with each other. A front caster 203 and a rear caster 204 that can not rotate are provided under the longitudinal frame of each frame 201, 202, respectively.

When the rolling walker 200 is used, each frame 201, 202 is rotated to open around the connecting shaft 208, as shown in FIG. 29. At this time, a hook fixed to the lateral pipe portion 209 of the second frame 202, for example, engages with the lateral pipe portion 207 of the first frame 201 so that the frames 201 and 202 link fixedly between themselves to keep them opened. That is, the hook 206 and the lateral pipe portion 207 engaging with the hook 206 form a frame fixing means. Here, the hook 206 is disposed in front of the seat 205 in order not to interfere with the seat 205.

The rolling walker 200 can be used by a user gripping the handles to walk and the rolling walker 200 also can be used as a chair to be sat on the seat 205 by the user when the user gets tired or so. The seat 205 is adapted to be pulled up when the user is walking with the users feet put in front of the rear caster 204.

Further, the rolling walker 200 can be folded to be compact when, e.g. it is not used, as shown in FIG. 30, by inwardly rotating each frame 201, 202 around the connecting shaft 208.

The above-described rolling walker 200, however, is not able to be fixed with the frames 201 and 202 folded and a grounding space X between the front and rear frames 203 and 204 becomes longer due to its own weight when the rolling walker is forced to stand itself by supporting the frames 201 and 202 with the front caster 203 and the rear caster 204. Because of this, the rolling walker 200 can not stand with the frames 201 and 202 folded but can be only laid down, resulting in causing problems of not only taking space and being inconvenient but also getting dirty.

Particularly since the front caster 203 can rotate, a rotational axis of the front caster 203 should be taken in the vertical direction when the frames 201 and 202 are opened.

In this manner, a position of the front caster 203 becomes closer to the rear caster 204 to shorten the grounding space X between the casters 203 and 204 considerably when the frames 201 and 202 are closed, as indicated by a solid line in FIG. 30 and the whole body of the rolling walker inclines forward to easily fall down compared to a case in which the front caster 203 faces forward (indicated by a two-dash broken line in FIG. 30). Due to the reason, it was difficult for the rolling walker 200 to stand with the frames 201 and 202 closed.

Furthermore, with regard to the hook 206, a user operates it by holding it directly and operating the hook 206 becomes difficult when a seat 205 that is large enough to cover the upper portion of the hook 206 is employed. It could be possible to extend an operating lever of the hook 206 to the outside of the seat 205 in order to avoid this. However, another problem has been occurred that the seat 205 is interfered by the operating lever when the seat 205 is pulled up from the horizontal position.

Accordingly, the present invention is aimed at providing a rolling walker that can be folded to stand when it is not used and also can improve its operation to open the frames.

SUMMARY OF THE INVENTION

To achieve the purpose, in a rolling walker having frames including a first frame supported by front casters and a second frame supported by rear casters connected with each other by a connecting shaft so that the frames can fold, and a handle provided on either first frame or second frame, the rolling walker according to the present invention is provided with a closed frame fixing means which connects the first and the second frames when the first and second frames are rotatably folded around the connecting shaft to be closed.

Thus, the first and second frames are folded to fix with each frame in a closed position by the closed frame fixing means which fixes frames in a closed position. In this manner, the rolling walker can stand with its frames folded so that the rolling walker can be kept standing even in a small space when it is not used.

Moreover, the rolling walker according to the present invention may have a straight moving means which fixes front casters in a back and front direction of the rolling walker and the rear casters may be adapted to be an unrotatable caster.

In this case, all casters can be fixed in the back and front direction so that straightness in moving of the rolling walker can be attained. Namely, the casters can be prevented from rotating by fixing all the casters in the back and front direction, resulting in ensuring for a user to walk easily, though it is not easy to walk straight on a slope which inclines in the direction perpendicular to the direction to which the rolling walker moves because the wheels face downward if the front caster can rotate. The straightness in moving of the rolling walker can be ensured even on such a slope inclining in the direction perpendicular to the direction of the rolling walker's moving.

In addition, in the present invention, the straight moving means which fixes front casters in the back and front direction may be provided with a lock member movably attached to the first frame and locking recesses formed in both of the first frame and the front casters to limit the front casters to rotate by engaging the lock member with both recesses. In this case, since the lock member engages with both of the first frame and the front casters, the locking force can be greater compared to a case in which the lock member engages with the front casters only.

Further, in the present invention, it is preferable to provide the rolling walker with a means for fixing front casters in an opposite direction to enable the front caster to rotate to be fixed in a position where the center of the front wheel is positioned in front of the rotational axis of the front caster. In this case, the grounding space between the front and rear casters becomes longer and the whole body of the rolling walker is prevented from forwardly tilting. Thus, the rolling walker does not easily fall down when it is folded, resulting in ensuring its stable standing.

Furthermore, in the present invention, the rolling walker may be provided with an open frame fixing means which fixes frames in an open position to connect the first and second frames with each other for fixing their positional relations when the first and second frames are in an open position. In this case, since the frames can be fixed in a position of being used by the open frame fixing means which fixes frames in an open position, the rolling walker can be prevented from folding unexpectedly when the rolling walker gets shock, for example, the front caster hits against an obstacle.

Moreover, in the present invention, the rolling walker is preferably provided with a seat facing backward. The seat is rotatably supported on the lateral pipe portion of a frame that is defined as a front frame during walking and the seat is rotatable between a position where the seat is sat by a user and a position where the seat is evacuated. In this case, the user's feet can be put inside the rear frame when the seat is rotatably pulled up around the front lateral pipe portion so that the rolling walker can be used as a walker. Moreover, the appearance of the rolling walker becomes nicer since the seat and the frame overlap when they are laterally seen while the seat is pulled up. And, the user can sit on the seat just pulling down the seat and turning the user's body.

In the present invention, the rolling walker may be provided with a seat facing backward, which is rotatably supported on the lateral pipe portion of a frame that is defined as a front frame during walking and is able to rotate between a position where the seat is sat and a position where the seat is evacuated, and an open frame fixing means which fixes frames in an open position provided under the seat. The open frame fixing means which fixes frames in an open position may have a release lever that can rotate between a position where the release lever protrudes from beneath the seat and the open frame fixing means which fixes frames in an open position can be operated and a position where the seat is not interfered even it is pulled up. In this case, the release lever of the open frame fixing means which fixes frames in an open position protrudes from beneath the seat so that operation to release the means can be easier since the user can easily hold the open frame fixing means which fixes frames in an open position. Also, the release lever can rotate to move to a position where the release lever does not interfere with the seat, enabling the seat to be prevented from interfering with the release lever even the seat is pulled up.

Further, the rolling walker according to the present invention preferably has grips consisting of the handle provided on the right and left side respectively and a back belt whose ends are connected with front portions of the right and left grips of the handle respectively to be leaned on by the user. In this case, the user can lean his or her back on the back belt during sitting on the seat so that the user can take a rest in a more comfortable and stable position. The appearance of the rolling walker can be nicer because the handle can be formed with its open ends facing backward. It is also possible to adjust a position of the back belt according to the user's built. The belt can be adjusted according to the user if the user is fat or thin, and stability during sitting on the seat can be increased. Here, it is preferable to make a center portion of the back belt wider than other portions thereof. In this manner, the user's back can be supported with a larger surface area when he or she leans on the seat and comfortableness in sitting on the seat can be increased.

Furthermore, in the present invention, it is preferable to provide the rolling walker with the back. In this case, the user can take a rest in a more comfortable and stable position since the user can lean his or her back on the backrest when he or she sits on the seat.

On the other hand, the rolling walker according to the present invention may be provided with a seat facing forward on the lateral pipe portion of a frame that is defined as a rear frame during walking and the seat is rotatably supported so that a front portion of the seat can be pulled up. In this case, a cart having a seat facing forward, e.g. a type of cart that the user can sit on the seat by just walking up to the front of the seat when he or she gets tired during pushing the cart and walking with baggage or the like on it, can fold and stand in a folded position.

Further, in the rolling walker according to the present invention, it is preferable to form a portion of the seat surrounding the user's hip into raised higher than the center portion of the seat. In this case, the hip of the user sitting on the seat is supported being circumferentially surrounded so that the user can feel comfortable during sitting.

Furthermore, in the rolling walker according to the present invention, the right and left grips of the handle are preferably connected by the connecting portion. In this case, the user can hold the connecting portion between the right and left grips of the handle with comfortable width according to the size of the user's hand instead of holding the right and left grips of the handle forcibly so that the user can push naturally the rolling walker in a comfortable and vertical position.

Moreover, in the rolling walker according to the present invention, it is preferable to attach a removable bag to the frame. In this case, a user can carry his or her things housed in the bag. Since the bag is removable, the user can remove the bag having valuables in it out of the frame to carry with him or her when the user leaves the rolling walker so that the baggage is not stolen and the rolling walker is safety and convenient to use.

It is also preferable to provide the rolling walker with a seat rotatably supported on a lateral pipe portion of a frame that is defined as a rear frame during walking. The seat also can rotate between a position where the seat is sat and a position where the seat is evacuated, and the seat is used as not only a seat but also a lid of the bag. This makes the number of assemblies smaller since a lid of the bag should not be prepared individually.

Here, in the rolling walker according to the present invention, it is preferable to provide each of the front and rear casters with a main portion of the caster and a connecting portion for connecting the main portion with the frame, and the connecting portion is provided with either a caster rotating means which enables the main portion of the caster to rotate with respect to the frame or a caster fixing means which unrotatably fixes the main portion of the caster to the frame. In this case, assemblies such as the main portion of the caster, the wheel or the tire, except the caster rotating means and the caster fixing means, can be used not only for the rotatable caster but also for unrotatable caster. This can decrease the number of kinds of the assemblies, resulting in cutting the cost of assemblies or members.

Further, in the rolling walker according to the present invention, the connecting portion may be provided with an attachment portion where a lock member for locking rotation can be attached when the caster rotating means is disposed and a brake mechanism can be attached when the caster fixing means is disposed. In this case, the attachment portion can be shared between the caster that can not rotate and the caster that can rotate and each caster can be attached with individual members, resulting in giving distinct function to each caster while attaining utilization of assemblies for the plural purposes.

Furthermore, in the present invention, it is preferable to provide the rolling walker with a brake mechanism to stop rotation of the wheel by pulling a wire and a brake operation device that can operate the brake mechanism by pulling the wire. The brake operation device includes a cam member rotatably supported with respect to the handle and attached with the wire, and a locking mechanism for locking an operation lever in a position in which the operation lever has been rotated to the second direction. The operation lever is also provided with a first pressing portion for rotating the cam member in the direction of pulling the wire when the operation lever is operated to the first direction and a second pressing portion for rotating the cam member in the direction of pulling the wire when the operation lever is operated to the second direction. The cam member is provided with a first receiving portion pressed by the first pressing portion of the operation lever and a second receiving portion pressed by the second pressing portion.

In this case, as the brake operation device connects the operation lever with the wire by the cam mechanism, the operation lever can be directly attached to the handle so as to rotate. In this arrangement, the rotational center of the operation lever is always fixed irrespective of directions to be operated and a user can obtain stable feeling of operation. Consequently, operating the brake of the rolling walker can be improved. Also, because of the provision of the lock mechanism for locking the operation lever in a position in which the operation lever has been rotated to the second direction, the locking of the operation lever can be kept even if the cam member becomes loose for some reason or other when it is locked and then the cam member engages again with the operation lever when the cam member returns to the original state, resulting in increasing stability of locking.

Here, in the rolling walker according to the present invention, it is preferable to dispose the operation lever, the cam member and the lock mechanism so that the operation lever being at the neutral position is stopped not to rotate by three points of the first and second pressing portions and the lock mechanism. In this case, since the operation lever being at the neutral position is stopped not to rotate by the three points, the operation lever stably stops without shaking. Consequently, the wire can be pulled without play when the operation lever being at the neutral position is operated to either the first direction or the second direction, and a brake response to the operation of the operation lever becomes better to obtain a nice feeling of operation.

Further, in the rolling walker according to the present invention, the operation lever may have a ring-shaped operating portion. In this case, the operation lever can be operated to rotate to either direction by putting one or more fingers of the user in the operating portion. In this manner, the user should not grip over again every time he or she changes the direction of operating the operation lever, and good operational feeling can be obtained.

On the other hand, in the rolling walker according to the present invention, the frame and the handle may be connected through a rise and fall portion. The rise and fall portion includes an outer pipe fixed to the frame, an inner pipe fixed to the handle and slidably fitted to the outer pipe, an outer hole communicating with the outer pipe and having a female screw, a plurality of inner holes communicating with the inner pipe, and a operating screw which is engaged with the female screw of the outer hole and piercing through the inner hole. The end portion of the operating screw presses the inner surface of the inner pipe.

In this case, since the bottom end portion of the operating screw comes into contact with the inner surface of the inner pipe, a damaged portion is not exposed outside even if a place contacting with the operating crew of the inner pipe is damaged, and the appearance of the rolling walker does not get worse. The appearance, therefore, becomes nicer comparing to a case in which the operating screw presses the inner surface of the inner pipe to damage it and the damaged portion is exposed.

Further, since the operating screw is pierced through the inner holes of the inner pipe, the inner pipe does not oscillate if the operating screw comes loose due to oscillation from an expansion and contraction mechanism, enabling the inner pipe to ensure its stable fixation. The inner pipe also has a plurality of inner holes formed therein so that the length of the expansion and contraction mechanism can be changed gradually. Thus, each length of the plurality of expansion and contraction mechanisms can be equal easily, comparing to a case using an expansion and contraction mechanism that does not expand and contract gradually.

Furthermore, the rolling walker according to the present invention has an armrest on the frame having a handle so that the rolling walker can be used as a walking trainer. In this case, the walking trainer can fold and stand.

The walking trainer is preferably provided with a load mechanism enabling the rear caster to constantly give a load to rotation of the wheel. In this case, the walking trainer can be prevented from moving with light force by adjusting the wheel of the rear caster to be always loaded, and therefore the walking trainer can be prevented from moving ahead of a user, for example, when a user, who lost the full use of the feet, uses the walking trainer, thereby increasing safety in using the walking trainer. Also, a user has to put the walking trainer forward to move the trainer, and this action trains the user for walking.

DESCRIPTION OF THE PREFERRED EMBODIMENTS

Figure 1:
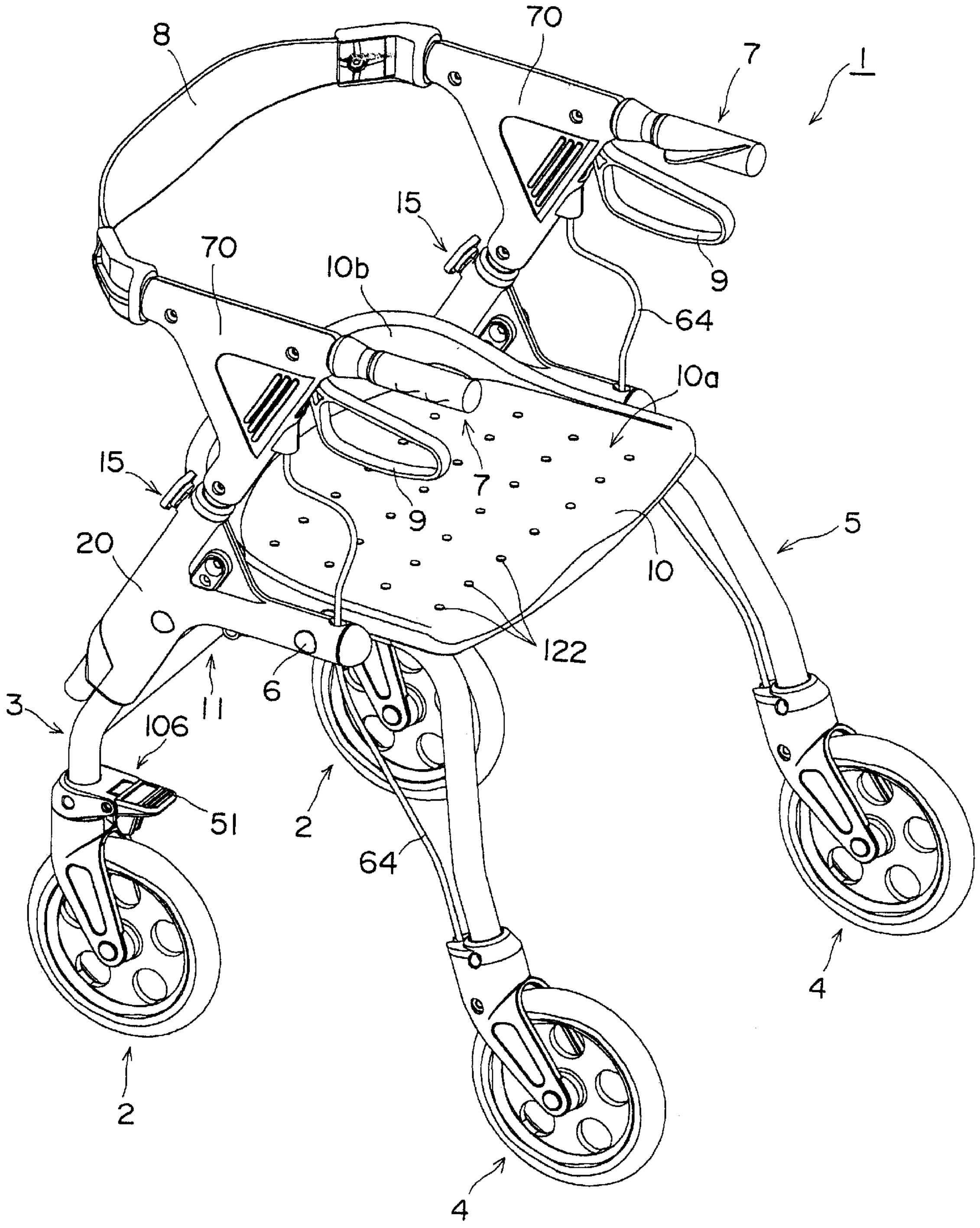
FIG. 1 is a back perspective view of a rolling walker of the present invention when it is used.

The configuration of the present invention will now be described in detail on the basis of embodiments illustrated in the accompanying drawings.

FIGS. 1 through 18 shows an embodiment of a rolling walker 1 of the present invention. The rolling walker 1 includes cross type frames of a first frame 3 supported by a front caster 2 and a second frame 5. supported by a rear caster 4. The first frame 3 and the second frame 5 are connected with a connecting shaft 6 so as to fold. The rolling walker 1 further includes a handle 7 provided on an upper end of a handle support frame 91 so as to protrude backward from the frame 91, a back belt 8 linking with each front portion of the right and left handles 7, a brake operation device 9 provided under each handle 7, and a seat 10 attached to the second frame 5 so as to be pulled up. The front caster 2 and the rear caster 4 are provided to the right and left ends of each of the first frame 3 and the second frame 5.

Figure 4:
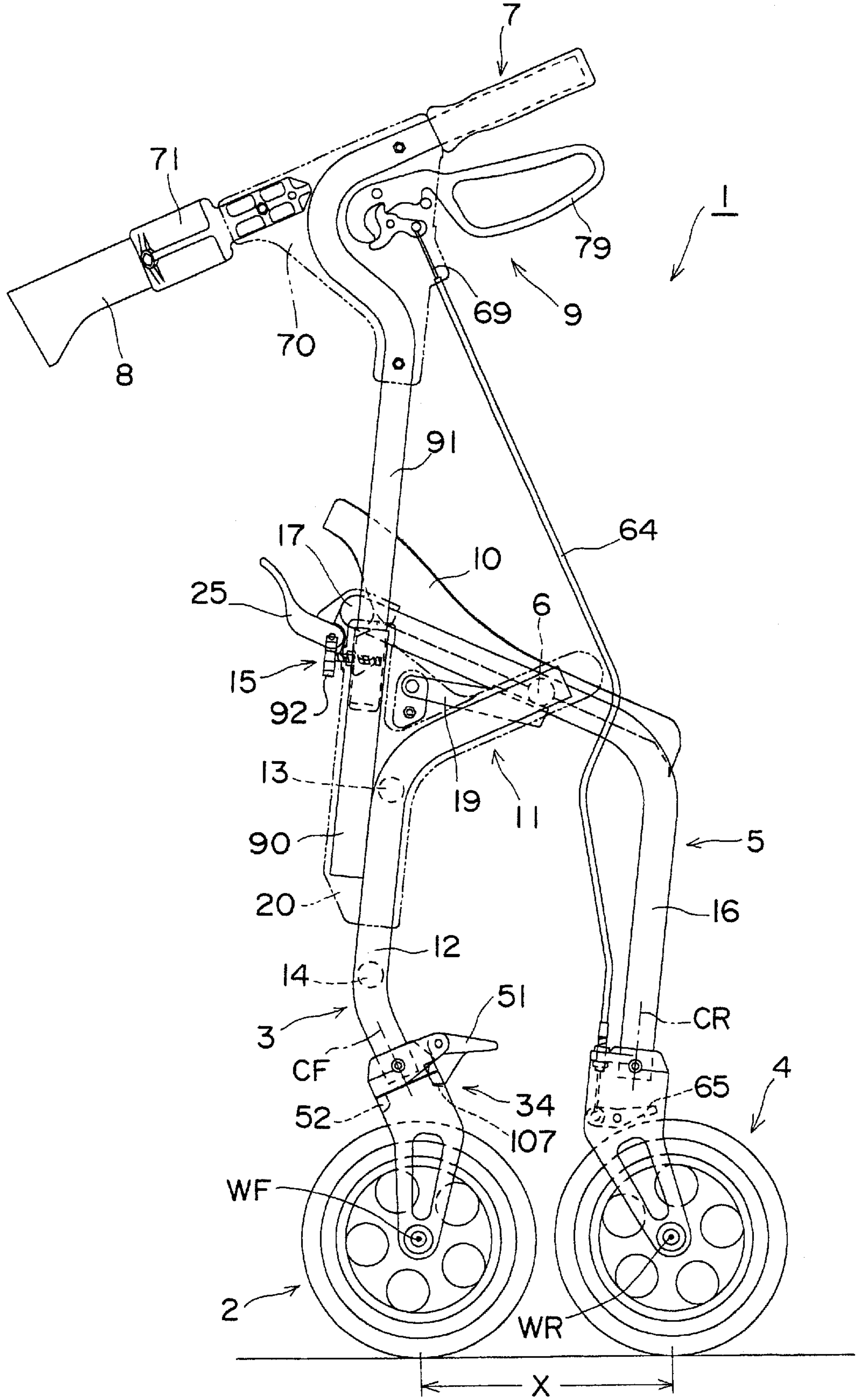
FIG. 4 is a side view thereof when it fold to stand.

The rolling walker 1 has a closed frame fixing means 11 which fixes frames in a closed position, which enables the rolling walker to stand by connecting the first frame 3 with the second frame 5 when the first frame 3 and the second frame 5 are folded around the connecting shaft 6. The rolling walker 1 also has a means 34 for fixing front casters in an opposite direction enabling the front caster to rotate to be fixed at a position where a center of the front caster wheel WF is in front of a rotational axis CF of the front caster 2 when the first and the second frames 3 and 5 are folded to close. In this manner, a grounding distance X between the front and rear wheels (between the center of the wheel WF and the other one WR) becomes longer than that in a case where the front caster 2 faces backward and also the position of the wheel becomes lower to prevent the body of the rolling walker from inclining forward when the first frame 3 and the second frame 5 are folded to be fixed by the closed frame fixing means 11 which fixes frames in a closed position, as shown in FIG. 4, after turning the front caster 2 to look opposite to be fixed, and the center of gravity of the walker's body can be positioned within the distance X between the front and rear wheels. Thus, the rolling walker 1 can stand being closed without falling. The rolling walker 1 is, therefore, easily kept standing in a small place for storage without lying down or leaning against the wall or the like. It is noted that the rear caster 4 is an unrotatable caster but just moving back and front. The rear caster 4 is so arranged to have a caster axis CR that is a direction to give a load from the second frame 5 and to have the center of the wheel WR which is located at the back of the caster axis CR.

Figure 11:
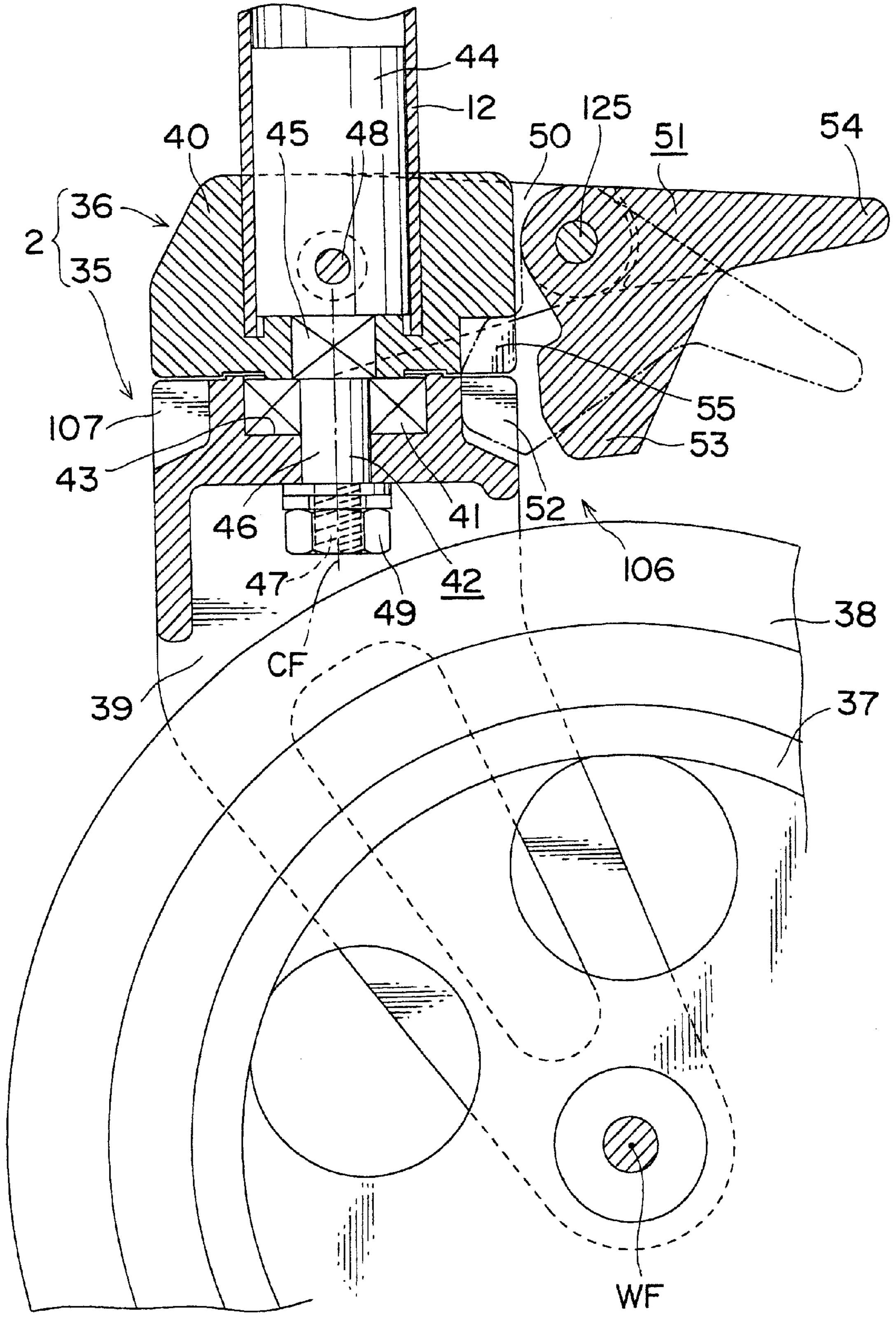
FIG. 11 is a side view of a front caster thereof.

The means for fixing front casters in the opposite direction 34 in the embodiment according to the present invention includes a locking recess 107 for standing formed in the main portion of the caster 35 which can rotate as shown in FIG. 11, and a lock member 51 unrotatably attached to the first frame 3, and the means is arranged to turn the front caster 2 to the front to be unrotatably fixed by means of fitting of the lock member 51 to the recess 107 for standing.

Figure 5:
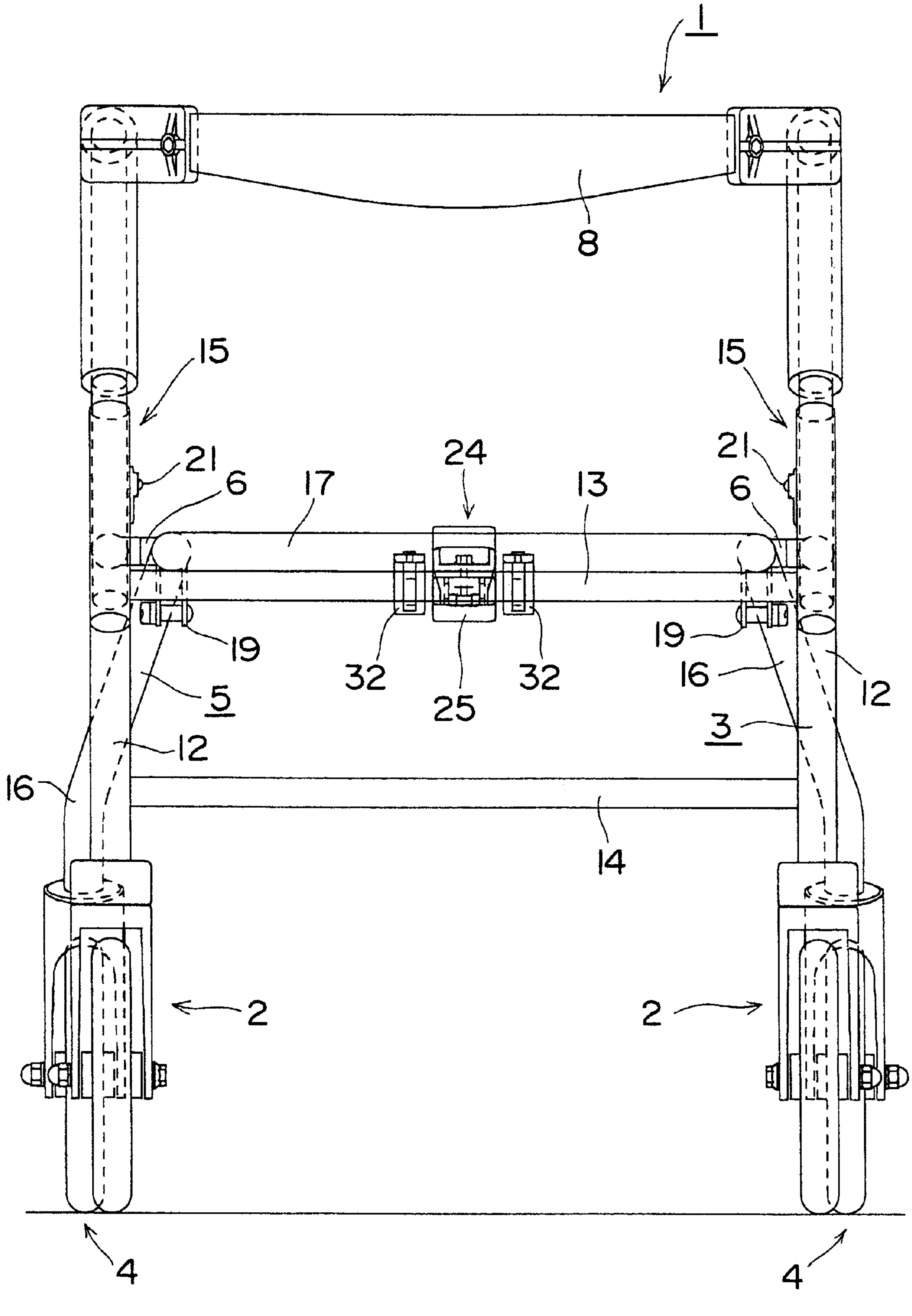
FIG. 5 is a front view thereof when it is used.

The first frame 3 includes a pair of longitudinal pipe portions 12,12 disposed on both sides as shown in FIG. 5, two lateral pipe portions 13, 14 horizontally provided to connect with each longitudinal pipe portion 12, and a rise and fall portion 15 provided on each longitudinal pipe portion 12 to support the handle 7 and a handle supporting frame 91 so as to rise and fall. Each longitudinal pipe portion 12 has its front portion curved backward and its end portion attached with the connecting shaft 6. The bottom end portion of each longitudinal pipe portion 12 is lightly curved so as to be perpendicular when the rolling walker is used, and is attached with the front caster 2 so that the center of the rotational axis CF can be perpendicular.

Figure 6:
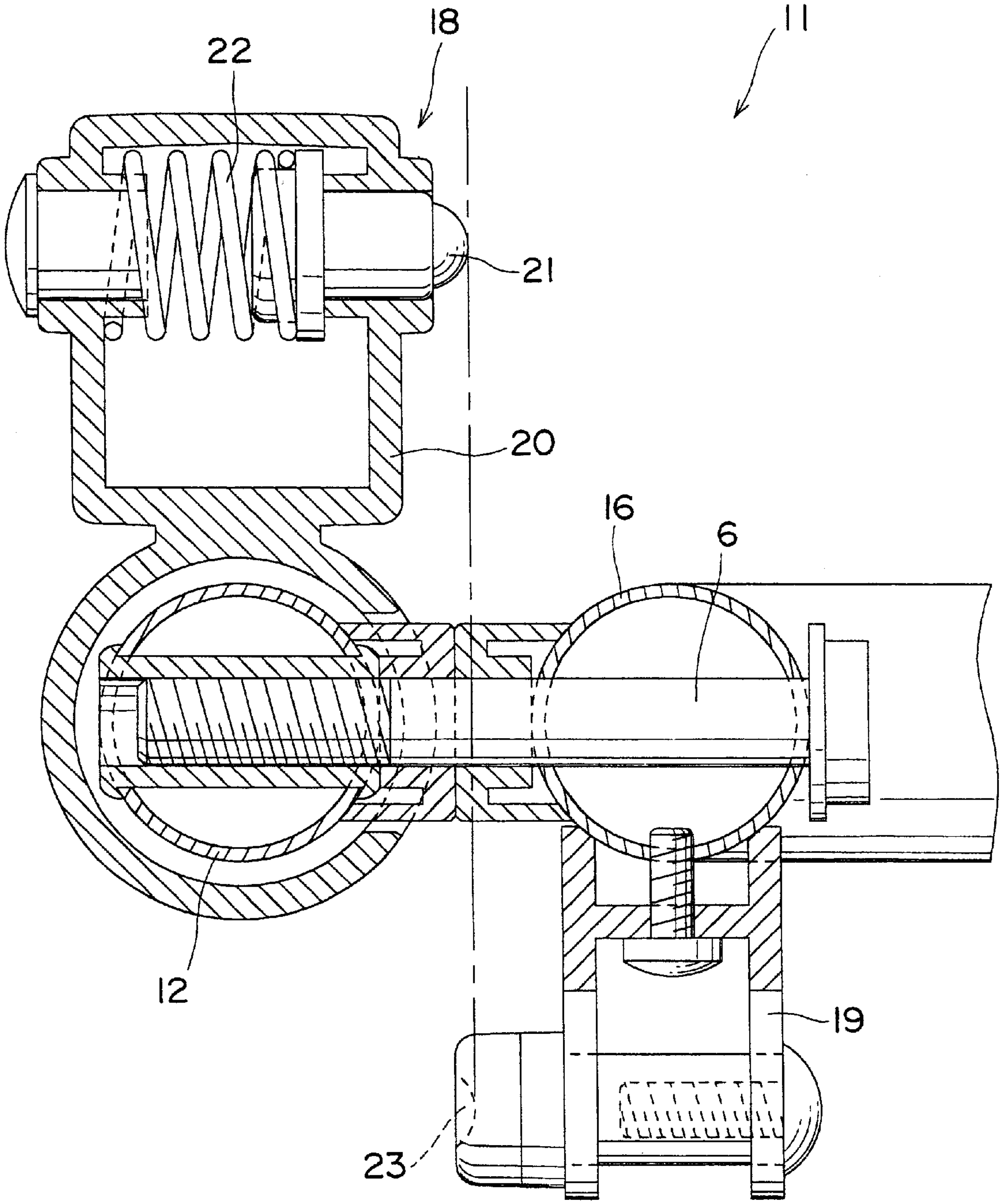
FIG. 6 is a longitudinal sectional view thereof taken along line VI—VI of FIG. 7.

The second frame 5 consists of a longitudinal pipe portion 16, 16 provided on each side of the frame 5 and a lateral pipe portion 17 linking with each top portion of the longitudinal pipe portions 16, 16. The first half portion of each longitudinal pipe portion 16 is made into horizontal while the last half portion thereof is made into curved to be a slant having an acute angle. The rear caster 4 is attached to a bottom portion of each longitudinal pipe portion 16. The first frame 3, as shown in FIG. 6, is rotatably connected with the second frame 5 by the connecting shaft 6 having, e.g. a bolt shape. The longitudinal direction of the bolt is provided to be the same as the direction in width of the seat and the first frame 3 and second frame 5 can rotate around the bolt.

Figure 7:
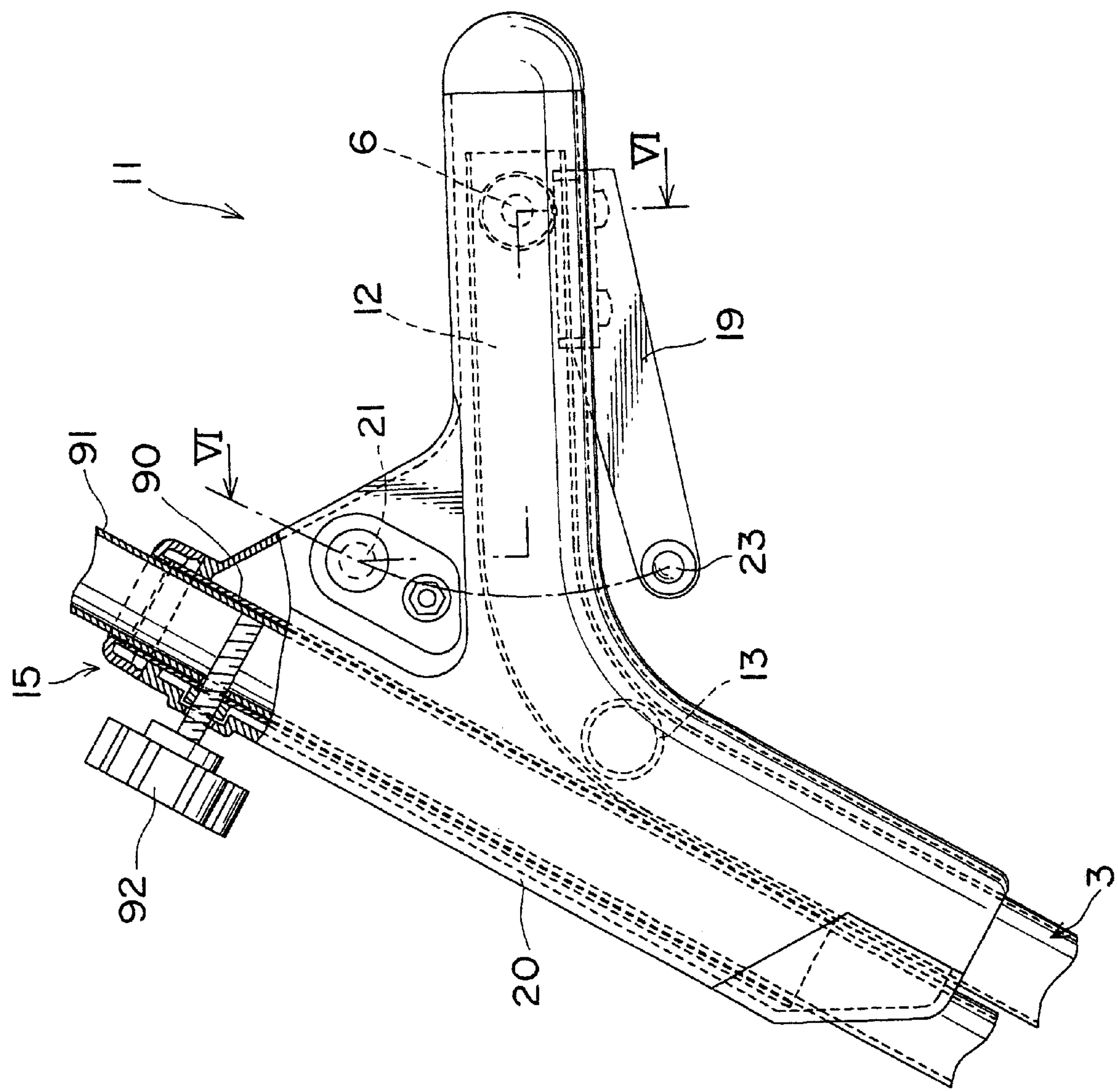
FIG. 7 is a side view of a closed frame fixing means which fixes frames in a closed position thereof.

The closed frame fixing means 11 which fixes frames in a closed position, in this embodiment, includes an engagement mechanism 18 attached to the first frame 3 as shown in FIGS. 6 and 7, and an arm 19 attached to the second frame 5. The engagement mechanism 18 is attached to a side cover 20 provided on the upper portion of the longitudinal pipe portion 12 of the first frame 3. The engagement mechanism 18 consists of a projection 21 which can slide in the direction of the width of the rolling walker 1 and whose end portion has a hemispherical shape, and a ball plunger having an impetus giving means 22 composed of a helical compression spring to compress the projection 21 toward inside the direction of the width of the rolling walker 1.

The arm 19 which can engage with the engagement mechanism 18 is screwed on the longitudinal pipe portion 16 of the second frame 5. A recess 23 is formed in the end portion of the arm 19 to engage with the projection 21 of the engagement mechanism 18 when the frames are closed. In this arrangement, as shown in FIG. 4, the recess 23 of the arm 19 is engaged with the projection 21 of the engagement mechanism 18 to be fixed by the impetus giving means 22 when the first frame 3 and the second frame 5 are folded while the rolling walker is not used, so that each of the frames 3 and 5 can be kept in a closed position. To open each frame of 3 and 5, force against the impetus giving means to release the projection 21 from the recess 23 is given between the frame 3 and 5. Thus, each frame of 3 and 5 in a closed position can be kept and also each frame of 3 and 5 can be released from the closed portion by just one pushing, resulting in easy operation.

Further, the rolling walker 1 includes an open frame fixing means 24 which fixes frames in an open position to connect the first frame 3 and the second frame 5 with each other to fix the relation therebetween when the first frame 3 and the second frame 5 are in an open position. In this arrangement, the frames 3 and 5 are opened so that the frames 3 and 5 are fixed in a position of being used, and the rolling walker 1 can be prevented from unpreparedly getting folded in case the front caster 2 has run against an obstacle when the rolling walker 1 is used.

Figure 8:
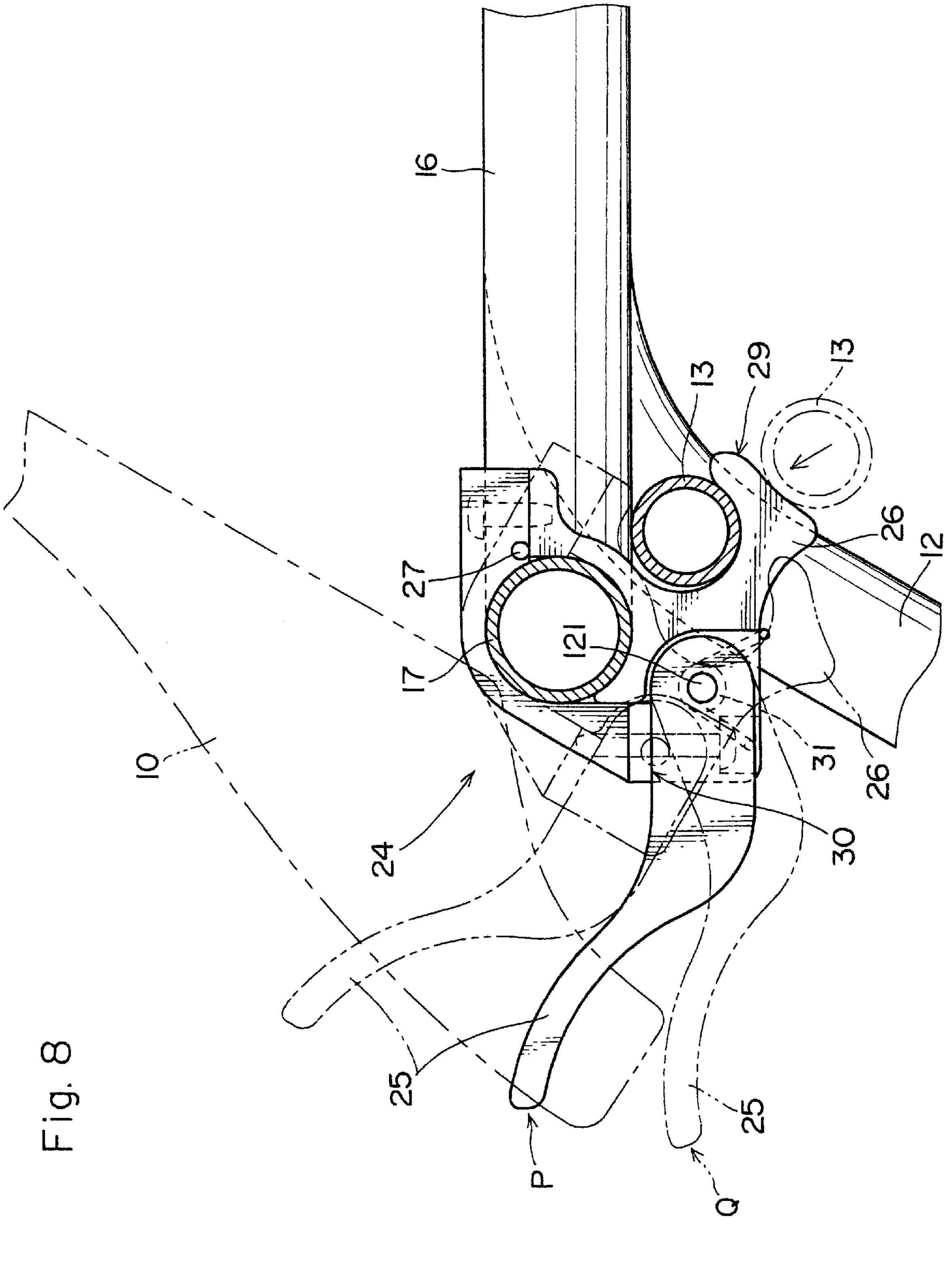
FIG. 8 is a side view of an open frame fixing means which fixes frames in an open position thereof.
Figure 9:
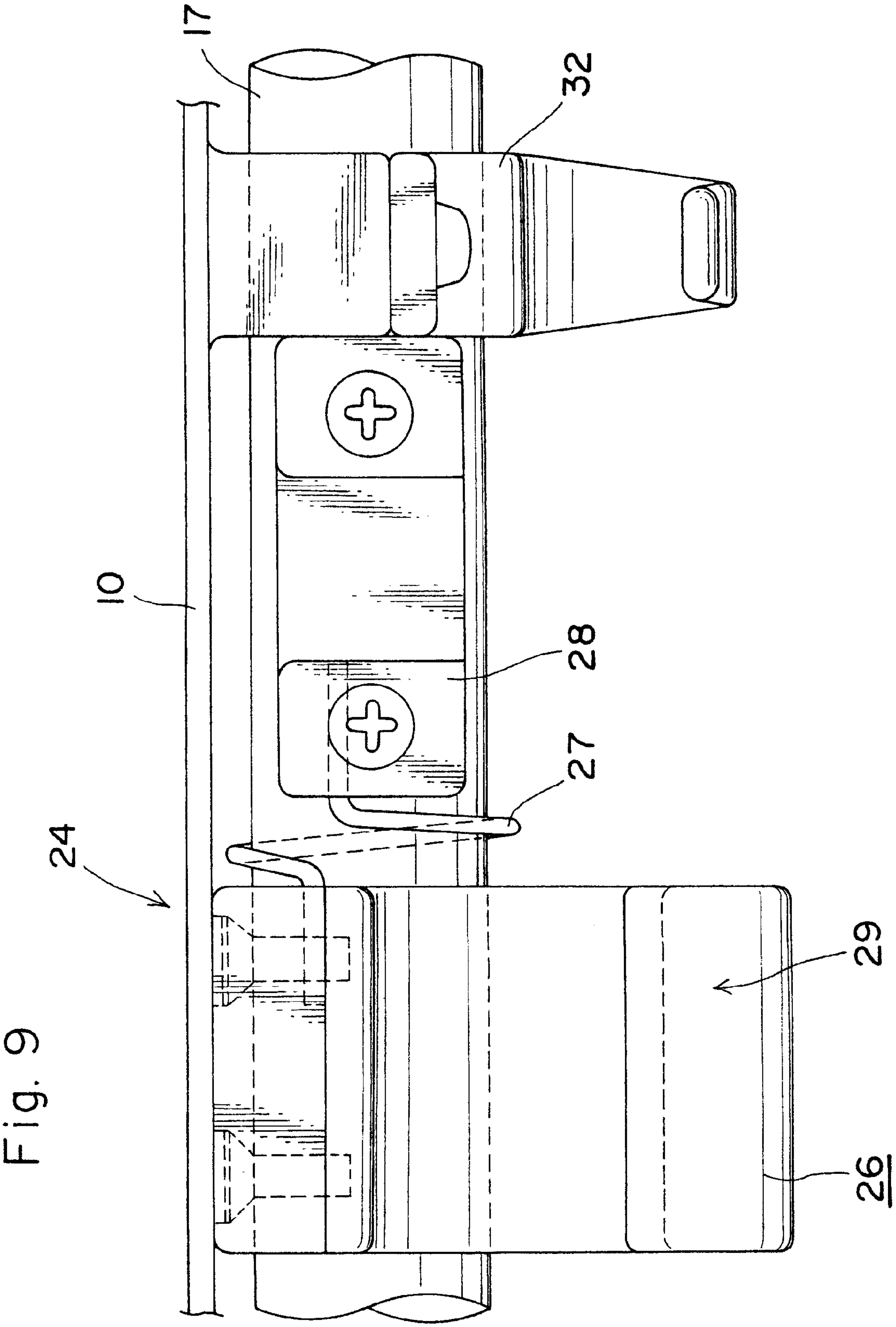
FIG. 9 is a front view of an open frame fixing means which fixes frames in an open position thereof.

The open frame fixing means 24 which fixes frames in an open position has a release lever 25 disposed under the seat 10 as shown in FIGS. 8 and 9. The release lever 25 has its length protruding from the edge of the seat 10 in a position for sitting, and is rotatably attached thereto between a position P where the means 24 can be operated to be released and a position Q where the lever does not interfere with the seat 10 when the seat is pulled up. Concretely, the release lever 25 is rotatably attached to a pawl portion 26 disposed on the lateral pipe portion 17 of the second frame 5 by a supporting shaft 121, and pushed up by an impetus-giving twisting spring 31 consisting of a helical torsion spring. The means 24, therefore, can be released by operating the release lever 25 without having obstruction by the seat 10 and the seat 10 can be pulled up without interfering with the release lever 25.

The open frame fixing means 24 which fixes frames in an open position includes the pawl portion 26 attached to the lateral pipe portion 17, and an impetus giving spring 27 consisting of a helical torsion spring giving twisting impetus to the pawl portion 26. The pawl portion 26 is rotatably attached to the center portion of the lateral pipe portion 17 of the second frame 5 and is also able to engage with the upper lateral portion 13 (which will be described as a lock pipe portion hereinafter) of the first frame 3. The impetus giving spring 27 gives impetus to the pawl portion 26 in the direction of engaging with the lock pipe portion 27. The other end portion of the impetus giving spring 27 is fixed to the lateral pipe portion 17 of the second frame 5 by a fixing means 28. A guide way 29 is formed on the pawl portion 26 to produce force to rotate against force from the impetus giving spring 27so that the pawl portion 26 can go through the lock pipe portion 13 when the lock pipe portion 13 comes into contact with the pawl portion 26 from the outside. In this manner, the pawl portion 26 is opened by opening frames 3 and 5 to let the lock pipe portion 13 go through the pawl portion 26 when the lock pipe portion 13 comes into contact with the guide way 29, and then the lock pipe portion 13 enters the pawl portion 26 to close the pawl portion 26 by the impetus giving spring 27 to be locked.

When external force is not given to the release lever 25, the top surface of the release lever 25 comes into contact with a stopper surface 30 of the pawl portion 26 by the impetus giving torsion spring 31. Consequently, the pawl portion 26 can be rotate together with the release lever 25 in the direction of releasing the pawl portion 26 from the lock pipe portion 13 when the release lever 25 is raised. The position of the release lever 25 becomes a position P where the releasing operation is possible. The release lever 25 is also pushed to the position P where the releasing operation is possible by the impetus giving twisting spring 31. In this manner, the release lever 25 is coming into contact with the stopper surface 30 of the pawl portion 26 while external force is not given to the release lever 25. In this state, the release lever 25 is pulled up to let the pawl portion 26 rotate clockwise around the lateral pipe portion 17 of the second frame 5 to come off from the lock pipe portion 13, shown in FIG. 8, and then the relation of fixation between the frames 3 and 5 is released. Here, by action of raising the release lever 25, the lateral pipe portion 17 of the second frame 5 is raised, and each frame of 3 and 5 can be folded around the connecting shaft 6 without a break, resulting in one operation to release the frames 3 and 5 from the open position and to operate the rolling walker to fold.

Further, the seat 10 is pulled up when the frames 3 and 5 are in an open position and then the rear end of the seat 10 pushes down the release lever 25 resisting the impetus-giving twisting spring 31. This can evacuate the release lever 25 to a position Q where the release lever 25 does not interfere with the seat 10 so that the seat 10 can be pulled The seat 10 is rotatably supported by one of the frames, for example, the second frame 5. A hold member 32 is provided to both sides of the open frame fixing means 24 which fixes frames in an open position to rotatably hold the seat 10.

Figure 10:
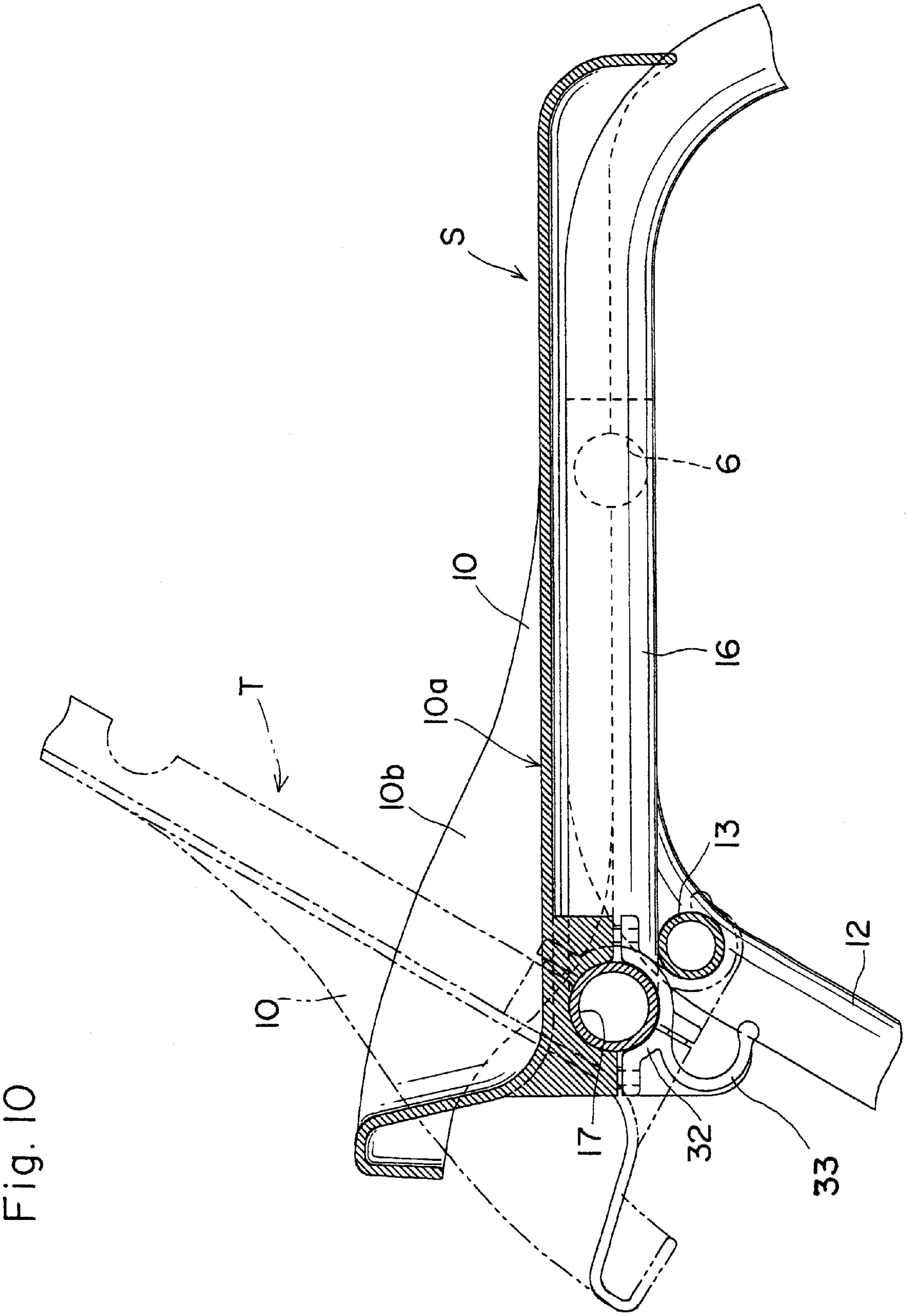
FIG. 10 is a side view of a seat thereof.

The seat 10 can be rotated in the range between a position S where the seat is in a horizontal position to be sat (a position for sitting) and a position T where the seat is pulled up to be evacuated for moving, as shown in FIG. 10. The seat 10 in the position S for being used is supported on the second frame 5 and the open frame fixing means 24 which fixes frames in an open position. In this arrangement, the user's weight can be securely supported. A lock pawl portion 33 is formed on part of the hold member 32 for locking the position of the seat 10 by engagement of the lock pipe portion 13 with the seat 10 when the seat 10 is in the evacuated position T, thereby keeping the seat 10 in the evacuated position T. Also, the seat 10 is locked with an inclination being parallel to the handle support frame 91 when the seat 10 is in the evacuated position T. In this manner, the first frame 3 and the seat 10 are laterally seen overlapped when the seat 10 is upwardly rotated to locate in the evacuated position T, and the appearance of the rolling walker 1 looks nice.

Furthermore, the seat 10 is made of, e.g. plastic, and formed such that the circumferential portion 10*b* of the seat surrounding a user's hip is made raised higher than the sitting portion surface 10*a*. Consequently, the user's hip is supported so that the hip is circumferentially surrounded, resulting in attaining better feeling in sitting the seat. Although the seat 10 is made of plastic in this embodiment, the present invention is not restricted to this example and the seat having a hard core material with a cushion thereon or the seat made by covering the core material and the cushion with fabric may be possible. On the seat top 10*a*, a plurality of small projections 122 are provided to prevent slipping.

The front caster 2 includes, as shown in FIG. 11, a main portion of the caster 35, a connecting portion 36 connecting the main portion of the caster 35 with the longitudinal pipe portion 12 of the first frame 3 and a straight moving means 106 which fixes front casters 2 in a back and front direction which fixes the front caster 2 in a back and front direction of the rolling walker 1. The main portion of the caster 35 has a wheel 37 with a tire 38 and a yoke 39 rotatably supporting the wheel 37.

The connecting portion 36 includes a base cap 40 fitted to the bottom portion of the longitudinal pipe portion 12 to be fixed, a bearing 41, and a bolt 42 (which will be described as a turn bolt hereinafter) defining a rotational axis. The bearing 41 is fitted to a fitting hole 43 having a cylindrical shape formed on the upper portion of-the yoke 39. The turn bolt 42 includes a head portion 44 fixed to the first frame 3, a rotating lock portion 45 having a square cross-sectional shape and fitted to the base cap 40 so as not to rotate, and a rotating portion 46 having a circular cross-sectional shape and fitted to the bearing 41, and a screw portion 47 pierced through the yoke 39. The longitudinal pipe portion 12, the turn bolt 42 and the base cap 40 are fixed with a fixing screw 48. The turn bolt 42 is screwed up with a nut 49 after piercing through the base cap 40, the bearing 41 and the yoke 4, thereby the bearing 41 can rotate and the main portion of the caster 35 can rotate with respect to the first frame 3.

The straight moving means 106 which fixes front casters 2 in a back and front direction with respect to the rolling walker 1. The means 106, in this embodiment, consists of a pair of recesses 52, 107 for locking formed 180° apart from the main portion of the caster 35 which can rotate, and at least a lock member 51 unrotatably attached to the first frame 3, thereby fixing the front caster 2 in a position where the caster faces back and front with respect to the rolling walker 1 so as not to rotate by the fitting the lock member 51 to either recess 52 or 107. Consequently, since the rear caster 4 is fixed in a back and front direction, it can be secured that the rolling walker 1 moves straight by fixing all of the casters 2 and 4. The rolling walker 1 can move straight even if a user walks on a slope inclined in the direction perpendicular to the direction to move. It is noted that in this embodiment the straight moving means 106 which fixes front casters in a back and front direction can function as a means 34 for fixing front casters in the opposite direction by means of providing a pair of recesses 52 and 107 with an interval of 180°. Originally, the front caster 2 which can rotate necessarily faces backward during walking (the center of the wheel WF locates at the back of rotational axis CF), and the straight moving means 106 which fixes front casters in a back and front direction is enough to have a recess 52 only.

An attachment portion 50 having a protruding-shape is formed on the base cap 40. The attachment portion 50 has a lock member 51 for locking rotation rotatably attached thereon by a supporting shaft 125. The lock member 51 includes a convex portion 53 which is capable of engaging over with both recesses 52 and 107 formed in the circumference of the yoke 39 and also an engagement groove 55 formed in the circumference of the base cap 40, and an operating portion 54 which can be operated by, for example, hand or foot of a user.

The lock member 51 is attached to the attachment portion 50 with some friction resistance, and can be kept in a position where the convex portion 53 engages with the recesses 52, 107 and the engagement groove 55 (indicated by a two-dash broken line in FIG. 11) and also in a position where the convex portion 53 disengages therefrom (indicated by a solid line in the same). Although friction resistance is used in this embodiment to keep the position of the lock member 51, the present invention is not restricted to this example and other modifications using a spring for locking a position, an engagement means consisting of concave and convex portions or the like are possible. Although the lock member 51 in this embodiment is directly operated by hand or foot of the user, the present invention is not restricted to this example and it may be possible to provide a remote control device for locking that can lock in the same way as the break operation device 9, for example, for operating the lock member 51 by remote controlling by a user as he or she is standing.

The rotation of the front caster 2 is locked by an engagement of the convex portion 53 over with both recesses 52 and 107 and the engagement groove 55. At this time, the convex portion 53 is over engaged with both recess 52 and 107 and the engagement groove 55, so that locking force can be grater compared to a case where the lock member 51 engages with only the recess 52 or 107 of the main portion of the caster 35.

The recess 52, 107 is formed in the upper front and the upper rear of the yoke 39, and the convex portion 53 of the lock member 51 is located in a position where the convex portion 53 fits to each recess 52, 107 when the wheel 37 is in the position where the wheel 37 faces back and front. And a recess fitted to the convex portion 53 when the yoke 39 is fixed to have a backward bent shape (a position indicated by a solid line shown in FIG. 3) is defined as a recess 52 for moving straight, while a recess fitted to the convex portion 53 when the yoke 39 is fixed to have a forward bent shape (a position indicated by a two-dash broken line shown in FIG. 3) is defined as a recess 107 for self-standing. Here, the front caster 2 can be fixed in a position where the front caster faces forward and backward even if the convex portion 53 fitted to either recess 52 or 107, thereby straight moving of the rolling walker 1 can be attained.

Figure 12:
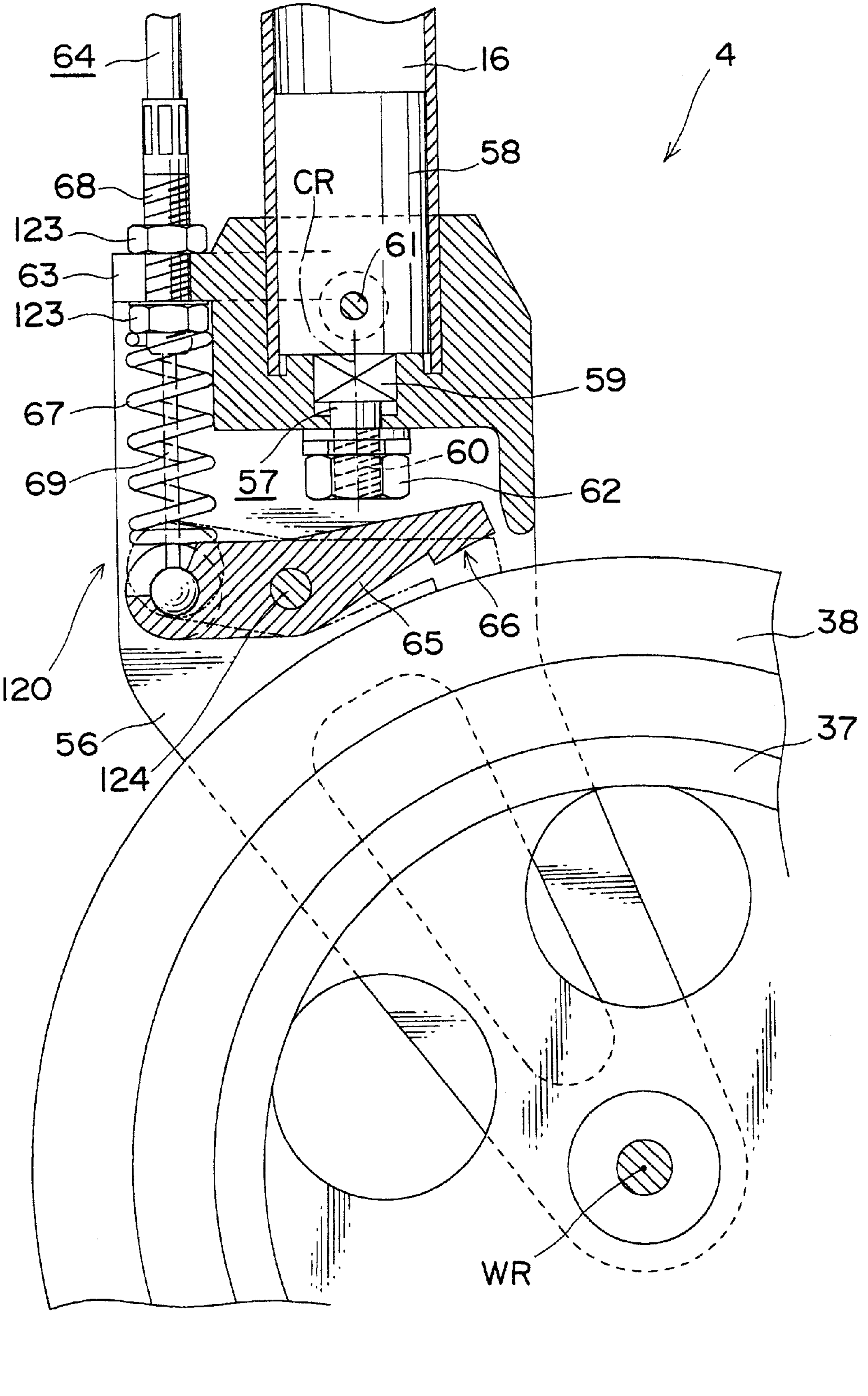
FIG. 12 is a side view of a rear caster thereof.
Figure 13A:
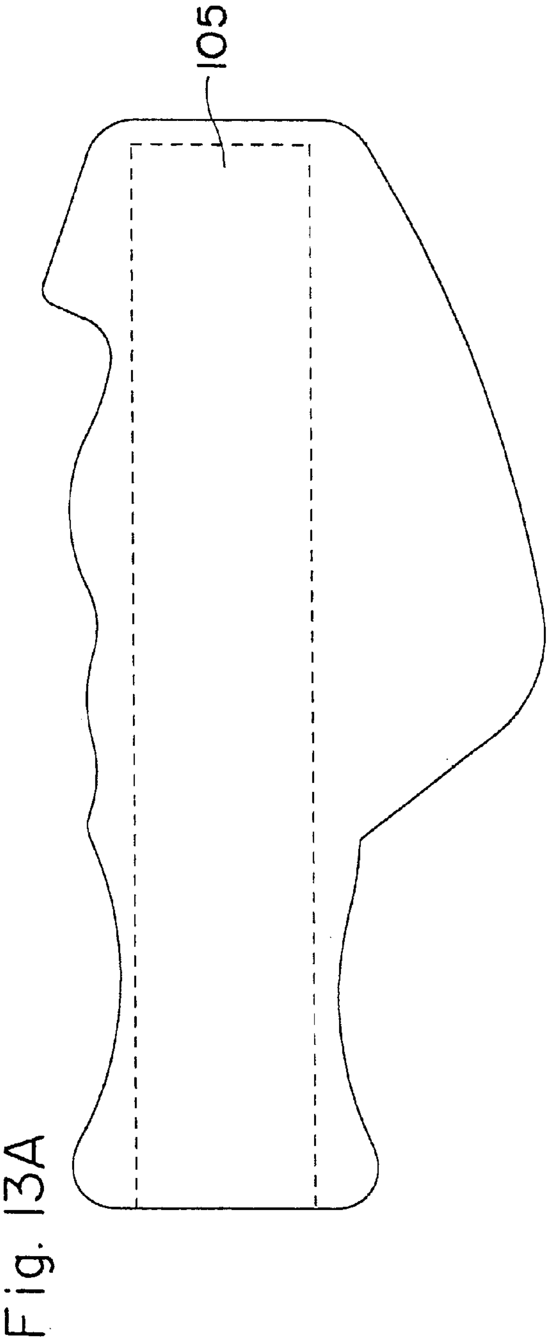
FIG. 13A is a plan view and FIG. 13B is a side view showing a grip of a handle for a right hand thereof.
Figure 13B:
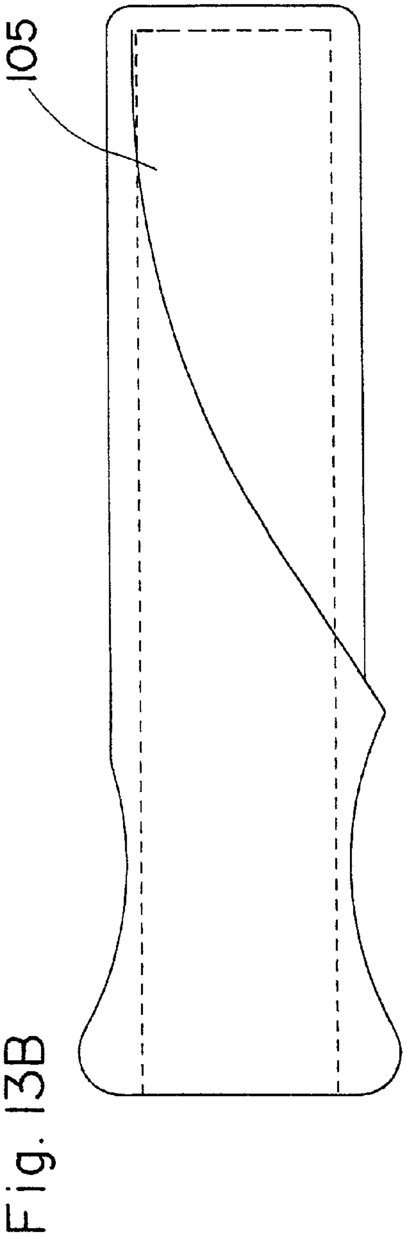

The rear caster 4, as shown in FIG. 12, is an unrotatable caster, including a wheel 37, a tire 38, a yoke 56 rotatably supporting the wheel 37, and a locking bolt 57 connecting the rear caster 4 with the longitudinal pipe portion 16 of the second frame 5. As the yoke 39, the yoke 56 is formed such that the center of the wheel WR is set to be off with respect to the center of the rotation CR (this is the center line of the longitudinal pipe portion 16 of the second frame 5 because the rear caster 4 does not rotate). In this manner, stability of the rolling walker 1 during standing with the frames 3 and 5 closed can be improved by positioning the front caster 2 and the rear caster 4 to face toward opposite each other. Also, in the rear caster 4, a connection of the wheel 37 with the frame 5 is carried out by a sole member, the yoke 56, and the number of assemblies can be decreased compared to a case using the plural members of the main portion of the caster 35 and the connecting portion 36, thereby realizing facilitation of the assembly line.

In this embodiment, each of the front caster 2 and the rear caster 4 is formed as a respective member except the wheel 37 and the tire 38, so that excessive assemblies such as projections are not necessary to be formed and the appearance of the rolling walker becomes simple and looks nicer.

The locking bolt 57 includes a head portion 58 inserted into the longitudinal pipe portion 16 to be fixed therein, a rotating lock portion 59 having a square (cross-sectional shape and being unrotatably fitted to the yoke 56, and a screw portion 60 pierced through the yoke 56. The longitudinal pipe portion 16 of the second frame 5 and the locking bolt 57 are fixed together by the fixing screw 61. The locking bolt 57 is pierced through the yoke 56 to be screwed with the nut 62. In this manner, the second frame 5, the locking bolt 57, and the yoke 56 cannot rotate one another, and then the rear caster 4 becomes incapable of rotating to be fixed in a position where the rear caster 4 faces back and front.

The rear caster 4 is attached with a brake mechanism 120. The brake mechanism 120 includes a brake shoe 65, a control cable 64, and a return spring 67.

An attachment portion 63 is formed on the upper portion of the yoke 56. An outer casing 68 of the control cable 64 for brake operation is inserted in the attachment portion 63, and the outer casing 68 is fixed to the attachment portion 63 by screwing with a nut 123 from the top and the bottom. The yoke 56 is rotatably attached with the brake shoe 65 by a supporting shaft 124. The brake shoe 65 rotates around the supporting shaft 124 by operating the control cable 64 to press the tire 38 by braking face 66, thereby restraining rotation of the tire 38. A wire 69 of the control cable 64 for remote controlling the brake shoe 65 is connected to the opposite end portion to the braking face 66 of the brake shoe 65. The return spring 67 is held between the attachment portion 63 and the brake shoe 65. The return spring 67 consists of a helical compression spring for giving impetus in the direction to which the braking face 66 separate from the tire 38. In this manner, the brake shoe 65 can be kept so as not to brake by means of the return spring 67 when the wire is not given tension. And, the brake shoe 65 presses the tire 38 with a pressing force according to tension to apply a brake by giving tension to the wire 69.

On the other hand, in the rolling walker 1, a handle supporting frame 91 extending upward as shown in FIGS. 1–5 is attached to the first frame 3. The handle support frame 91 is attached with the handle 7 protruding backward, and a back belt 8 projecting front and linking with both the right handle and the left handle. In this arrangement, a user can take rest sitting with his or her back against the belt when the user sits on the seat after turning around to put his or her body between the right and left handles 7. Here, the center portion of the back belt 8 is made wider than other portions thereof, thereby supporting the back with the larger area. A grip 105 is fitted to each of the right and left handles 7. As show in FIG. 13, the grip 105 is formed to have a shape identical with a shape of man's hand when holding the grip 105, so called Ergonomics design. In this arrangement, a user can hold the grip 105 with fitting touch.

Figure 2:
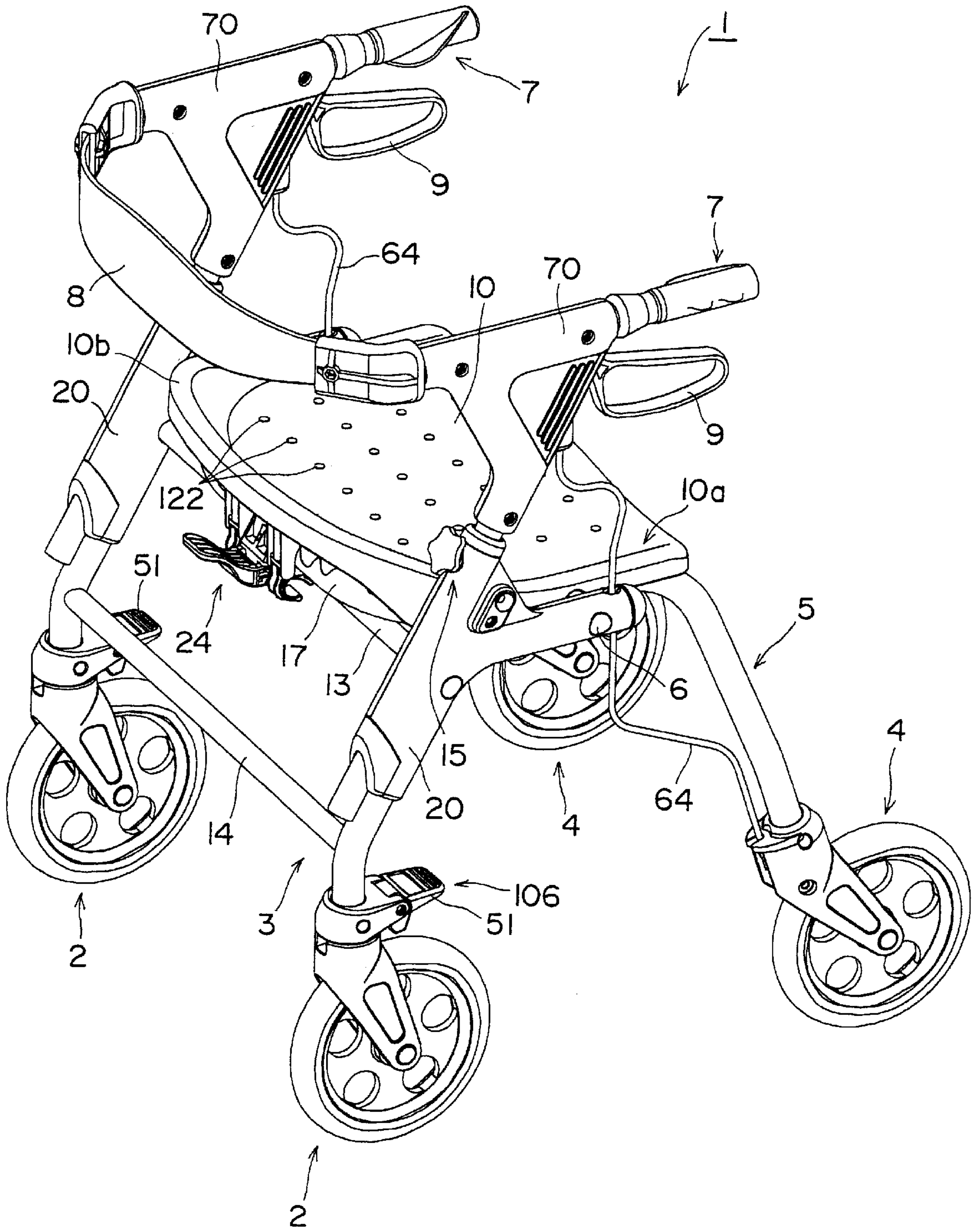
FIG. 2 is a front perspective view thereof when it is used.
Figure 3:
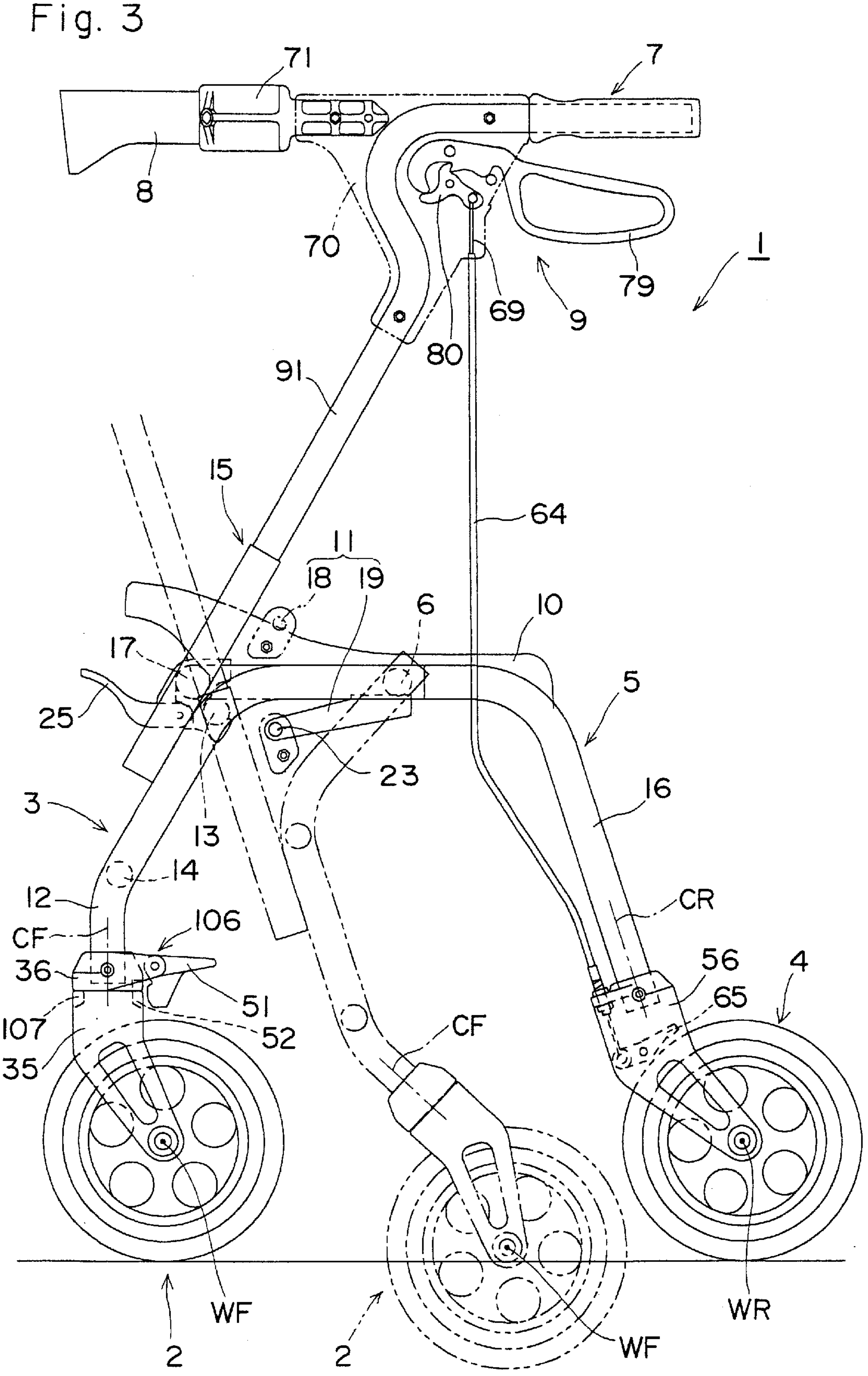
FIG. 3 is a side view thereof when it is used.

As shown in FIGS. 1–3, a handle cover 70 is attached over the upper portion of the handle support frame 91 to cover the pipe. To the handle cover 70, the back belt 8 and the brake operation device 9 are attached. The back belt 8 and the handle cover 70 are connected each other by a connecting member 71.

Figure 14:
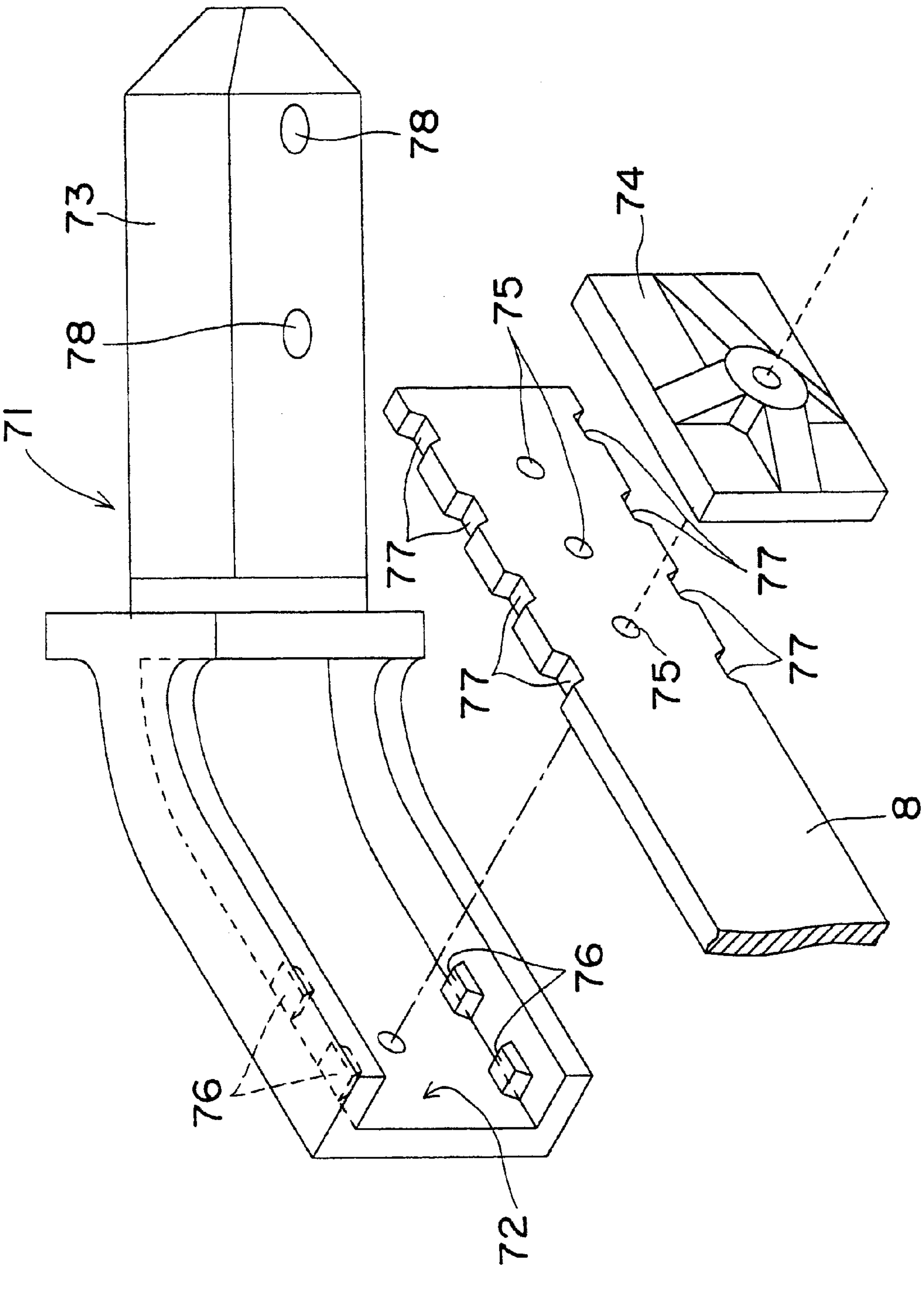
FIG. 14 is a perspective view showing a connecting member of a back belt thereof.

The connecting member 71 includes an attachment groove 72 to which the back belt 8 is attached and an insertion 73 inserted into the handle cover 70 to be supported thereby, as shown in FIG. 14. The back belt 8 is held by a cover member 74 and the end portion of the back belt 8 is accommodated in the attachment groove 72. And the connecting member 71, the back belt 8 and the cover member 74 are screwed to be fixed one another by piercing therethrough with a bolt or the like, thereby connecting the back belt 8 with the connecting member 71. The back belt 8 has a plurality of through-holes 75 thereon, so that the back belt 8 is able to vary its length by changing the through-hole 75 to another to be screwed. Thus, a user can feel comfortable sitting on the seat by adjusting the back belt 8 according to the built.

Further, project ions 76 are formed on the top and the bottom surfaces of the inner wall of the attachment groove 72. Recesses 77 are formed in both edge is of the back belt 8. The engagement of the projection 76 of the attachment groove 72 with the recess 77 aims for preventing the back belt 8 from falling out. In this arrangement, a load on the through-hole 75 of the back belt 8 is lightened. And the connecting member 71 can be firmly connected with the back belt 8 by engaging the projection 76 with the recess 77 and also the fitting with a bolt or the like.

A plurality of through-holes 78 are formed in an insertion 73 of the connecting member 71. One of the through-holes is put on a through-hole formed in the handle cover 70 to be pierced with a bolt or the like for fitting, thereby connecting the connecting member 71 with the handle cover 70. The back belt can be changed in length by means of changing the through-hole 78 of the insertion 73 to another to be screwed, thereby adjusting the length of he back belt 8 according to the user's built.

Figure 15:
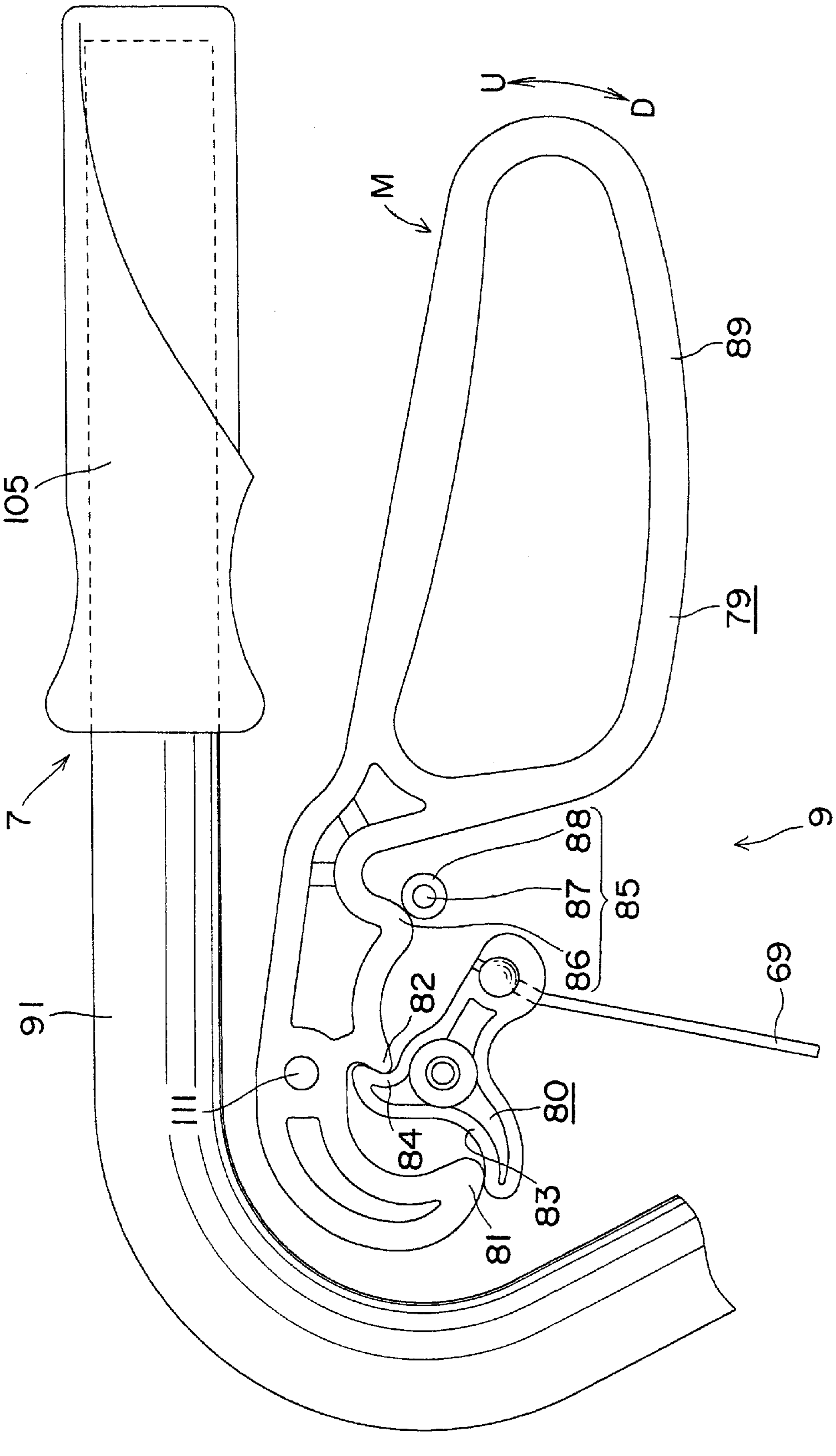
FIG. 15 is a side view showing an operation lever of a brake operation device thereof when it is in a neutral position.
Figure 16:
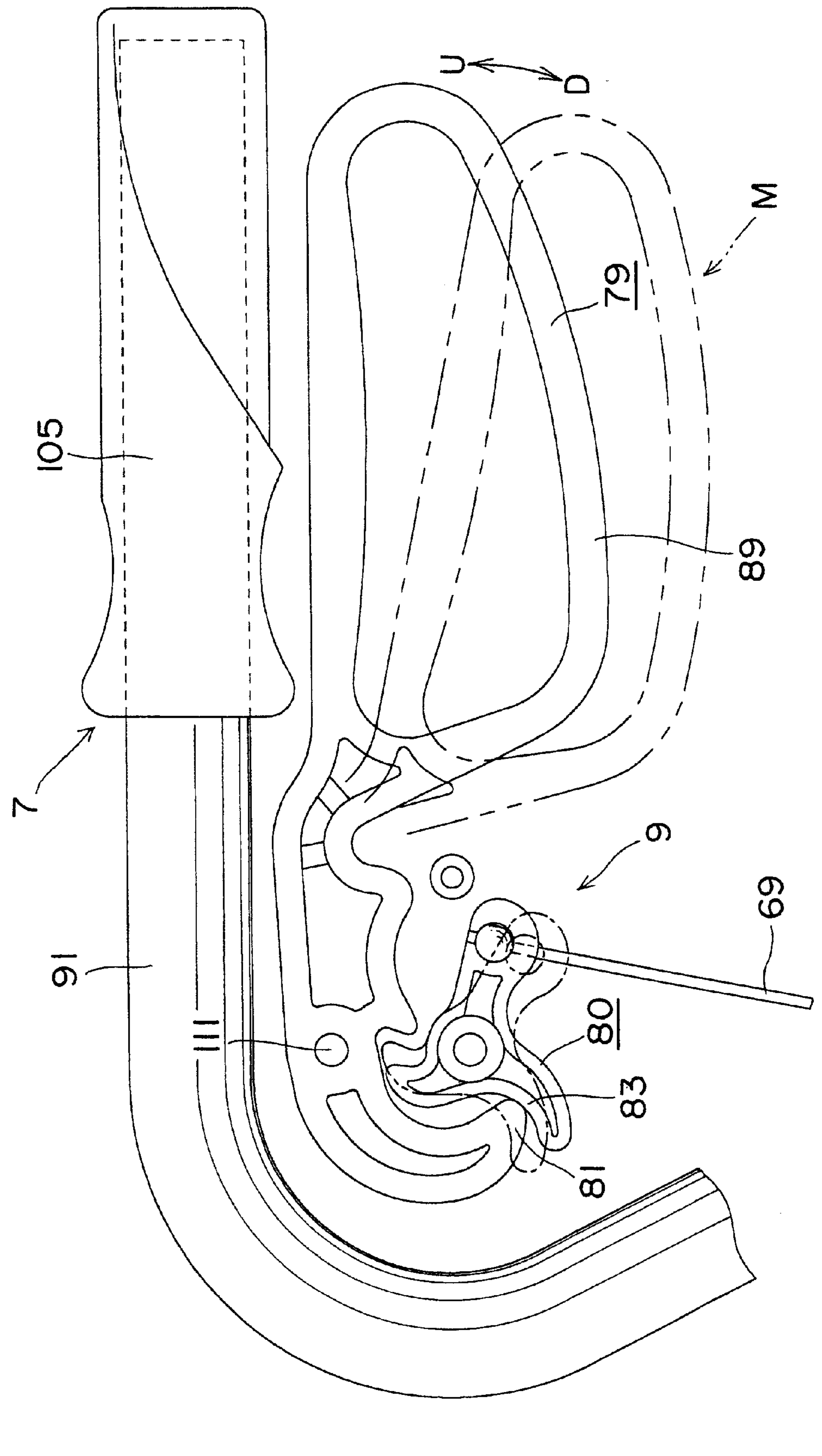
FIG. 16 is a side view showing an operation lever of an operation device thereof when it is pulled up.
Figure 17:
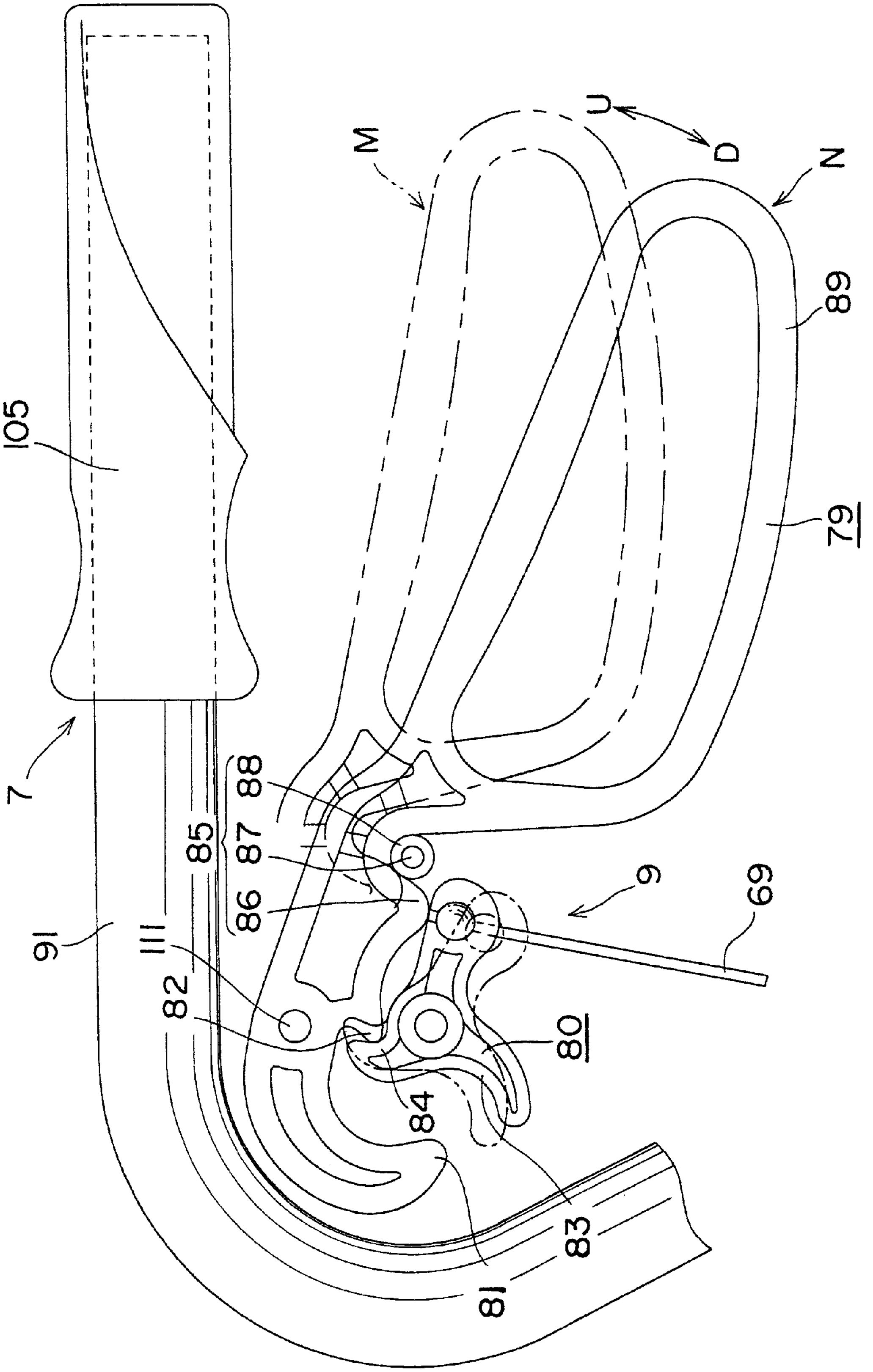
FIG. 17 is a side view showing an operation lever of an operation device thereof when it is pulled down.

As shown in FIGS. 15–17, the brake operation device 9 provided under the handle 7 has an operation lever 79 rotatably attached to the handle 7. The operation lever 79 can be operated toward the direction U and also toward the direction D. A wire 69 for operating the brake is pulled by operation of the operation lever 79. The brake operation device 9 has a cam member 80 rotatably supported to the handle 7 and attached with the wire 69, and a locking mechanism 85 which keeps the operation lever 79 in a parking position N (a position illustrated in FIG. 17) after rotating he operation lever 79 toward the second direction D. In this embodiment, the first direction is defined as an upward direction and the second direction is defined as a downward direction.

The operation lever 79 has a first pressing portion 81 and a second pressing portion E2. The first pressing portion 81 is for rotating the cam member 80 in the direction of pulling the wire 69 to apply the brake when the operation lever 79 is rotated toward the upward direction U. The second pressing portion 82 is for rotating the cam member 80 in the direction of pulling the wire 69 to apply the parking brake when the operation lever 79 is rotated toward the downward direction D. The cam member includes a first receiving portion 83 pressed by the first pressing portion 81 of the operation lever 79 and the second receiving portion 84 pressed by the second pressing portion 82 of the operation lever 79. In this arrangement, the brake operation device 9 connects the operation lever 79 with the wire 69 by a cam mechanism consisting of the first pressing portion 81 and the first receiving portion 83 or a cam member consisting of the second pressing portion 82 and the second receiving portion 84, and the operation lever 79 can be rotatably attached to the handle 7 directly or through such a fixing member as the handle cover 70 according to cases. In this embodiment, the operation lever 79 is rotatably supported to the handle cover 70 fixed to a handle support frame 91 by a lever support shaft 111. In this manner, the rotation center of the operation lever 79 is always fixed irrespective of the rotational center of the operation lever 79 being the operating direction U or D, thereby obtaining a stable feeling in operation. The end portion of the wire 69 is connected to the brake shoe 65 of the rear caster 4.

Thus, as shown in FIG. 16, the first pressing portion 81 presses the first receiving portion 83 to rotate the cam member 80 to pull up the wire 69 gradually when the operation lever 79 is pulled up toward the upward direction U slowly (indicated by a solid line) from the neutral position M (indicated in the drawing by a two-dash broken line).

Then the wire 69 is pulled down by the return spring 67 of the rear caster 4 to return the operation lever 79 to the neutral position M when external force to the operation lever 79 is removed.

As shown in FIG. 17, after the operation lever 79 is pushed down toward the downward direction D to move the operation lever 79 from the neutral position M (indicated by two-dash broken line in the drawing) to the parking position N (indicated by a solid line), the second pressing portion 82 presses the second receiving portion 84 to rotate the cam member 80 to pull the wire 69 up. At this time, the locking mechanism 85 works to fix the operation lever 79 in the parking position. In this manner, the locking mechanism 85 keeps locking of the operation lever 79 even if the cam member 80 becomes loose during locking or some reasons, thereby increasing stability in locking.

The locking mechanism 85 includes a locking projection 86 formed to the operation lever 79, a locking pin 87 against which the locking projection 86 hits to get over the locking pin 87, and a collar 88 rotatably fitted around the locking pin 87. The locking pin 87 and the collar 88 are attached to the handle cover 70 and the locking projection 86 hits against the locking pin 87 and the collar 88 to get over the locking pin 87 and the collar 88 when the operation lever 79 moves between the neutral position M and the parking position N.

At this point, the force to get over the collar 88 by the locking projection 86 is larger than the spring force of the return spring 67 of the rear caster 4. In this manner, a user can feel a click when the operation lever 79 changes between the neutral position M and the parking position N, and the operation lever 79 can be locked in the parking position N against the return spring 67, thereby keeping the brake applied to be able to function as a parking brake of the rolling walker 1. Also, the rotatable collar 88 is attached to the locking pin 87 to reduce friction between the locking projection 86 and the locking pin 87. In this embodiment, although the locking pin 87 is attached with the rotatable collar 88, the present invention is not restricted to this example and another embodiment, in which only the unrotatable locking pin 87 is used without attaching the collar 88, is possible.

Here, the brake operation device 9 is adapted to be disposed with the operation lever 79, the cam member 80 and the locking mechanism 85 to stop rotation of the operation lever 79 in the neutral position M by three points of the first pressing portion 81, the second pressing portion 82 and the locking mechanism 85. In this manner, the operation lever 79 is fixed so as not to rotate in the neutral position M by the three points, resulting in increasing stability of the operation lever 79 without a rattling. Thus, the wire 69 can be pulled without play even when the operation lever 79 is operated toward either direction U or D of the first and the second directions, resulting in increase of response from the braking to the operation with respect to the operation lever 79 to obtain a nice feeling in operating the operation lever 79.

According to the operation device 9, it is possible to switch operation to apply the brake gradually into operation to lock with the brake applied by changing the operating direction between upward and downward, thereby obtaining an easy operation even though it has many functions.

Also, the operation lever 79 has a ring-shaped operating portion 89. In this arrangement, a user can walk holding the handle 7 with his or her four fingers from the forefinger to the little finger put into the operating portion 89. When applying the brake, the user holds the handle 7 and the operating portion 89 to pull up the operation lever 79. Also, when applying the parking brake, the user, for example, releases the thumb from the handle 7 and pushes down the operation lever 79 with the four fingers to lock. In this manner, it is not necessary to hold the handle 7 again every time to pull up or to push down the operation lever 79, thereby obtaining a comfortable feeling in operation.

Figure 18:
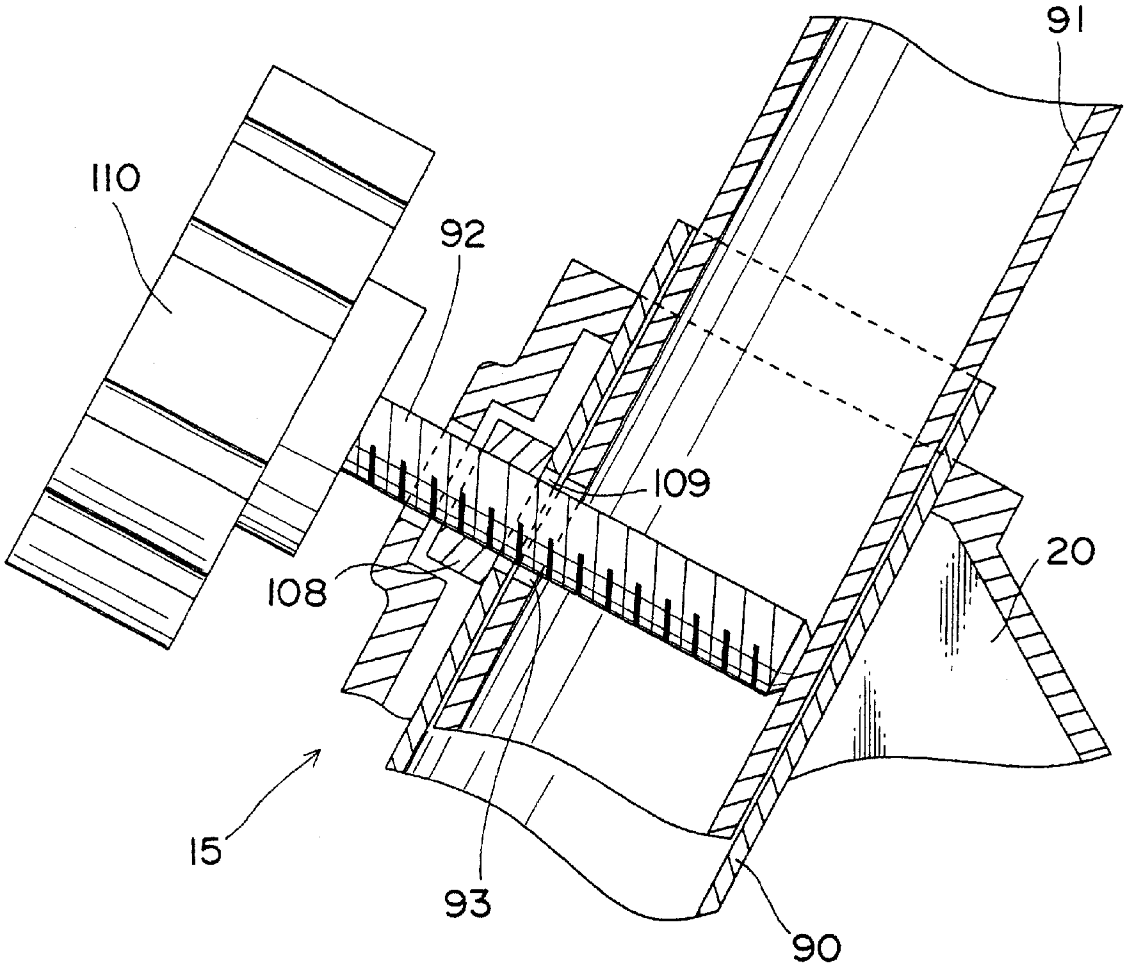
FIG. 18 is a central longitudinal sectional view showing a rise and fall portion thereof.

On the other hand, the rise and fall portion 15 provided on the upper portion of the first frame 3 and supporting the handle 7 so as to rise and fall, as shown in FIGS. 4 and 18, includes an outer pipe 90 attached to the longitudinal pipe portion 12 of the first frame 3, and a handle support frame 91 having a pipe-shape (which will be described as an inner pipe hereinafter) slidably fitted to the outer pipe 90. The outer pipe 90 is integrally formed with the longitudinal pipe portion 12 of the first frame 3 by means of welding or the like. The handle 7 is formed on the upper end of the inner pipe 91.

The rise and fall portion 15 includes an outer hole 109 communicating with the outer pipe 90 and having a male screw portion 108, a plurality of the inner holes 93 communicating with the inner pipe 91, and an operating screw 92 screwed with the male screw portion 108 of the outer hole 109 and piercing through one of the inner hole 93. The male screw portion 108 is adapted to be formed into a nut which is integrally formed on the edge portion of the outer hole 109 of the outer pipe 90 by welding or the like. Also, the operating screw 92 is formed with an operating grip 110 provided for facilitating operation to rotate. And, the bottom portion of the operating screw 92 pushes the inner surface of the inner pipe 91 outwardly.

The operating screw 92 is loosened and removed from the inner pipe 91 so that the inner pipe 91 can slidably rise and fall. And, the inner pipe 91 rises and falls in such a manner that one of the inner holes 93 lies on the bottom portion of the operating screw 92 so that the operating screw 92 can pierce through the inner hole 93 of the inner pipe 91. And, the inner surface of the inner pipe 91 is pressed toward the outer pipe 90 so that the position of the inner pipe 91 is fixed. According to the rise and fall portion 15, the bottom portion of the operating screw 92 comes into contact with the inner surface of the inner pipe 91, and if the contacting place of the inner pipe 91 with the operating screw 92 gets damaged, the damage does not appear outside so that the appearance of the rolling walker does not become worth, resulting in keeping the appearance in good condition. Further, the operating screw 92 pierces through the inner hole 93 of the inner pipe 91 so that the inner pipe 91 does not fall down if the operating screw gets loose by vibration during walking, thereby greatly obtaining safety during walking.

Further, a plurality of the inner holes 93 are formed in the inner pipe 91 to change the height of the handle 7 gradually so that the height of the handle 7 can be adjusted according to the user's built. In addition, the height can be adjusted gradually, and the differences in height between the right handle and the left handle can be told at first sight if they are unevenly set, so that such a misuse can be prevented.

Figure 19:
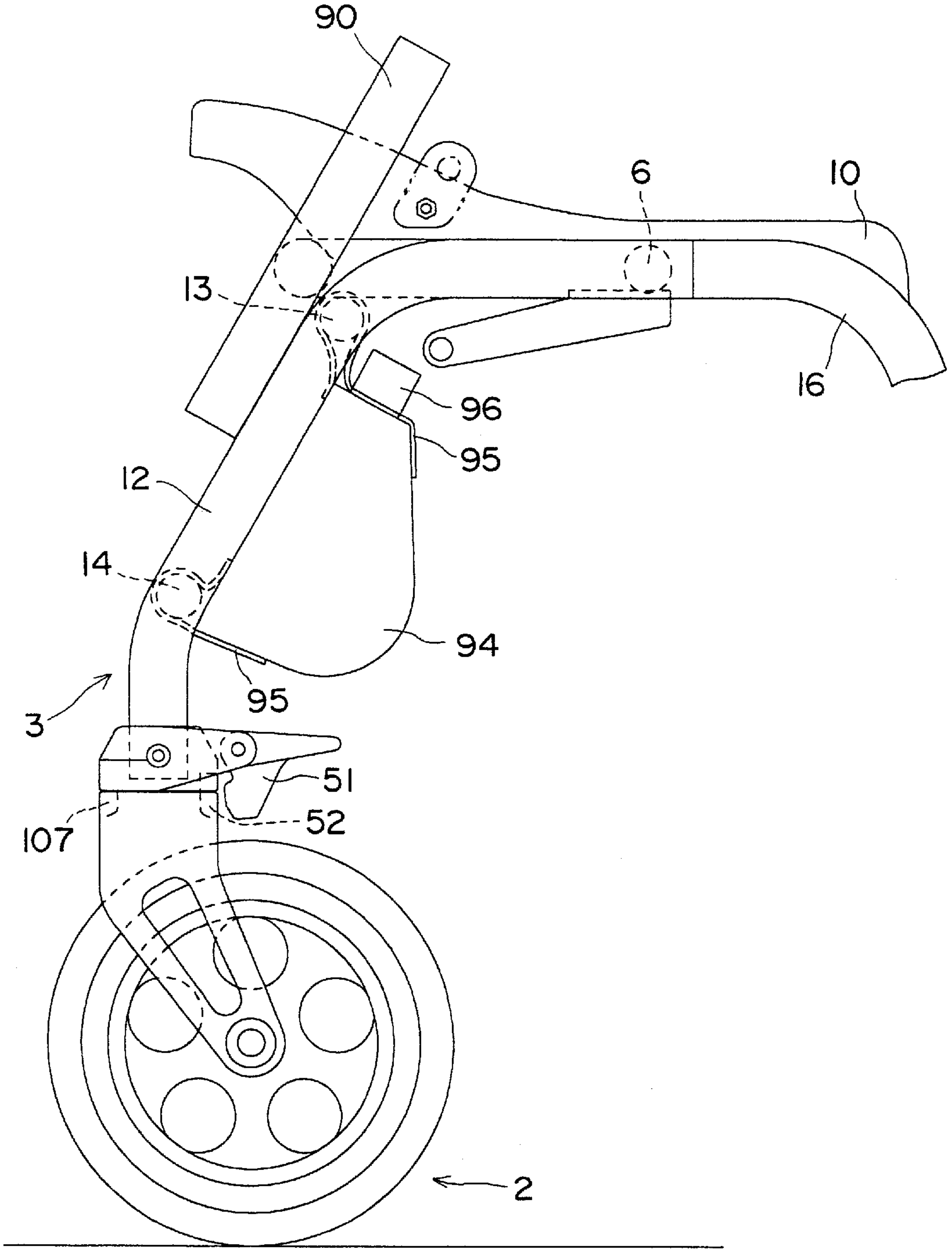
FIG. 19 is a side view showing a bag thereof.
Figure 20:
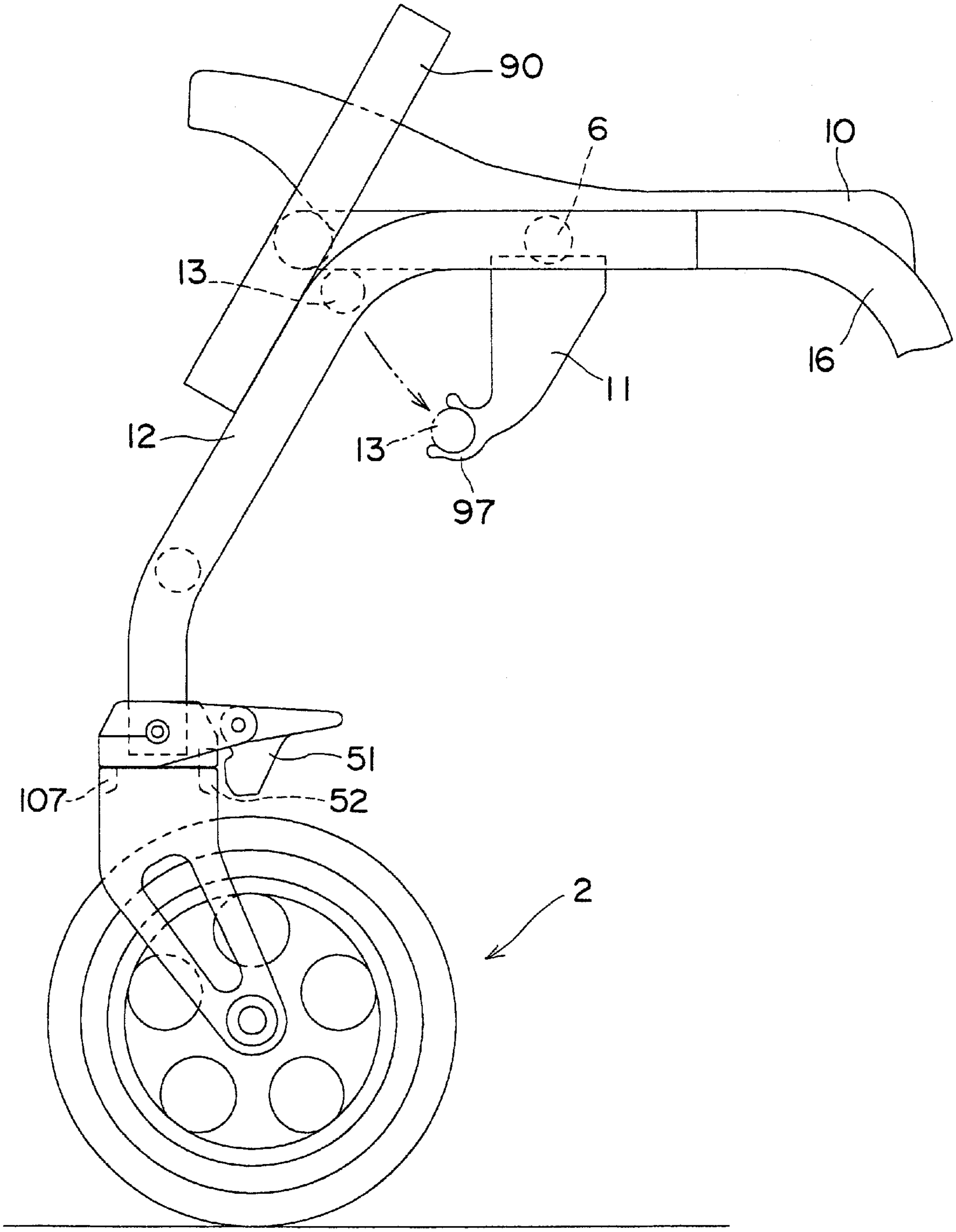
FIG. 20 is a side view showing another embodiment of a closed frame fixing means which fixes frames in a closed position thereof.

Furthermore, the rolling walker 1 according to the present invention, as shown in FIG. 19, has a bag 94 that is detachable to the first frame 3, so that a user can carry his or her things accommodated in the bag. The bag 94 is detachable so that the user can remove the bag 94 from the rolling walker 1 to take it with him or her when the user leaves the rolling walker 1, resulting in increasing safety in using the rolling walker 1 against theft.

The bag 94 has an attachment belt 95 having a hook-and-loop-fastener (Velcro fastener) on the top and bottom portions thereof, respectively. The attachment belt 95 is wound around each of the lateral pipe portions 13 and 14 to be fixed thereon. In this embodiment, the attachment belt 95 is provided on the right and the left sides of each of the lateral pipe portions 13 and 14 respectively, and totally four attachment belts 95 are secured. A hook-and-loop-fastener is also used for opening and closing a flap of the bag. The bag is attached with a strap 96 on the top portion thereof, so that a user can take the bag with him or her easily by holding the strap when the bag 94 is removed from the rolling walker 1.

The height of the handle is adjusted by means of the rise and fall portion 15 before using the above-mentioned rolling walker 1. At this time, the operating screw 92 loosens to be removed from the inner hole 93 of the inner pipe 91 so that the inner pipe 91 can be slid. And, the inner pipe 91 moves up and down to adjust the height of the handle 7, and then the inner hole 93 is put on the bottom portion of the operating screw 92 to fasten the operating screw 92 so that the height of the inner pipe 91 and the height of the handle 7 are fixed. The back belt 8 is also adjusted to the appropriate length beforehand.

Then, as shown in FIGS. 1–3, each of the frames 3 and 5 is opened. At this time, each frame 3, 5 can be kept in a open position by the open frame fixing means 24 which fixes frames in an open position. Also, at this time, the seat 10 is pulled up to the evacuated position T and then the position is kept by the lock pawl portion 33 of the hold member 32, so that a user can stand with his or her feet put ahead the rear caster 4, and the rolling walker 1 is also used as a walker. The user can walk holding the handle 7 with his or her body put ahead the second frame 5 and placed between the rear casters 4 and 4 or ahead of the rear caster 4.

At this time, the locking member 51 of the front caster 2 is released to make the front caster 2 rotatable, thereby easily changing the direction to walk. When walking on a slope or the like that inclines in the direction perpendicular to the direction to move, the front caster 2 is fixed in a position to move only forward and backward as the rear caster 4 by operating the locking member 51, thereby preventing the front caster 2 from rotating and moving downward on the slope, so that straight moving can be secured.

Also, operating the brake operation device 9 during walking can give braking force according to the force from holding or can start applying the parking brake. In this manner, a user applies the parking brake to park the rolling walker 1 in front of, e.g., the shop the user intends to enter, and remove the bag 94 to enter the shop with the bag 94. And, when the user takes rest, the seat 10 is returned to the horizontal position for the user's sitting. Then, the user can sit on the seat and take rest.

When closing the rolling walker 1, the front caster 2 is fixed in a position where the caster faces front. Then, the open frame fixing means 24 which fixes frames in an open position is released to fold the frames 3 and 5 respectively. In this position, the frames are locked by the closed frame fixing means 11 which fixes frames in a closed position. In this manner, the rolling walker 1 can stand with its frames folded.

Figure 26:
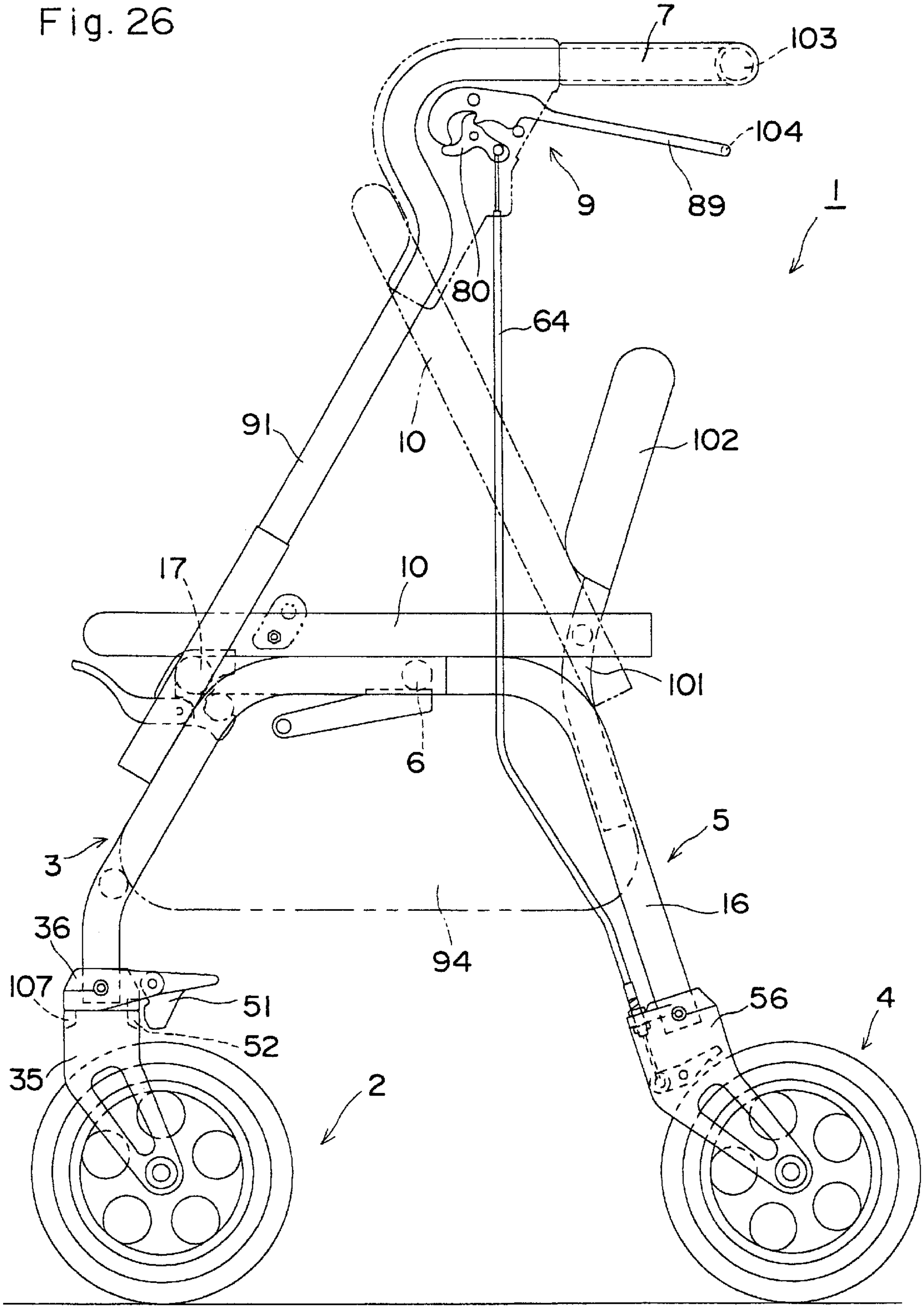
FIG. 26 is a side view showing another embodiment of a seat and a handle thereof.

Now will be described another embodiment of a rolling walker according to the present invention. The rolling walker is provided for being a cart. In this embodiment, a user moves to the front of the rolling walker to sit on the seat. For example, shown in FIG. 26, the cart is integrally formed by welding with a back support column 101 on the upper portion of the longitudinal pipe portion 16 of the second frame 5 in the body of the car shown in FIGS. 1–5. The back support column 101 is attached with a backrest 102 on the upper portion thereof and also rotatably attached with a seat 10 in the middle of the back support column 101. In the rolling walker 1, the back belt 8 is not employed while it is employed in the rolling walker 1 shown in FIGS. 1–3, and a user can enter the space between the right and left rise and fall portions 15 and 15 of the first frame 3, from the front. In this manner, the user moves to the front of the rolling walker 1 to sit on the seat facing the front and resting his or her back against the backrest 102. Here, the backrest 102 and the seat 10 have cushions therein, thereby increasing comfortableness in sitting.

Also, in this embodiment, the bag 94 is provided under the seat 10, and the seat is also used as a lid of the bag 94. Consequently, the bag 94 can be covered with the seat by placing the seat in the horizontal position. As indicated by two-dash broken line in FIG. 26, the seat 10 is upwardly rotated to open the bag 94 so that the user's things can be taken out or in.

Further, since a user cannot sit on the seat from back of the rolling walker 1 in this embodiment, the right and left handles 7 and 7 are connected through a connecting portion 103, enabling the user to hold the connecting portion 103 of the handle 7 with a comfortable width between the right and left hands without opening the hands to right and left. The rolling walker is, therefore, very easy to use. And, the operating portions 89 and 89 of the right and left brake operation devices 9 and 9 are connected together through a connecting portion 104. That is, the operating portion 89 does not have a ring shape shown in FIGS. 15–17 or so, but has a rod-shape whose longitudinal direction corresponds to the direction of width of the rolling walker 1. In this manner, the connecting portion 104 of the operating portion 89 exists under the connecting portion 103 of the handle 7 so that the user can easily operate the brake operation wherever the user holds the connecting portion 103 of the handle 7.

In the cart in which a user sits on the seat facing front, it may be possible to employ a support mechanism of the seat 10 that rotates around the lateral pipe portion 17 of the first frame 3, as the embodiments shown in FIGS. 1–19. In this case, the backrest 102 is attached to the back portion of the seat 10 so that the seat 10 can be pulled up with the back together. Also, it may be possible that the backrest 102 is attached to the back portion of the seat 10 so as to oscillate back and force to be able to move between the supporting position to support the user's back and the evacuated position where the seat is forwardly fallen. In this case, the seat 10 can be pulled up along with the backrest 102 after the backrest 102 is forwardly fallen, thereby preventing the backrest 102 from interfering with the handle 7 or the like.

Figure 27:
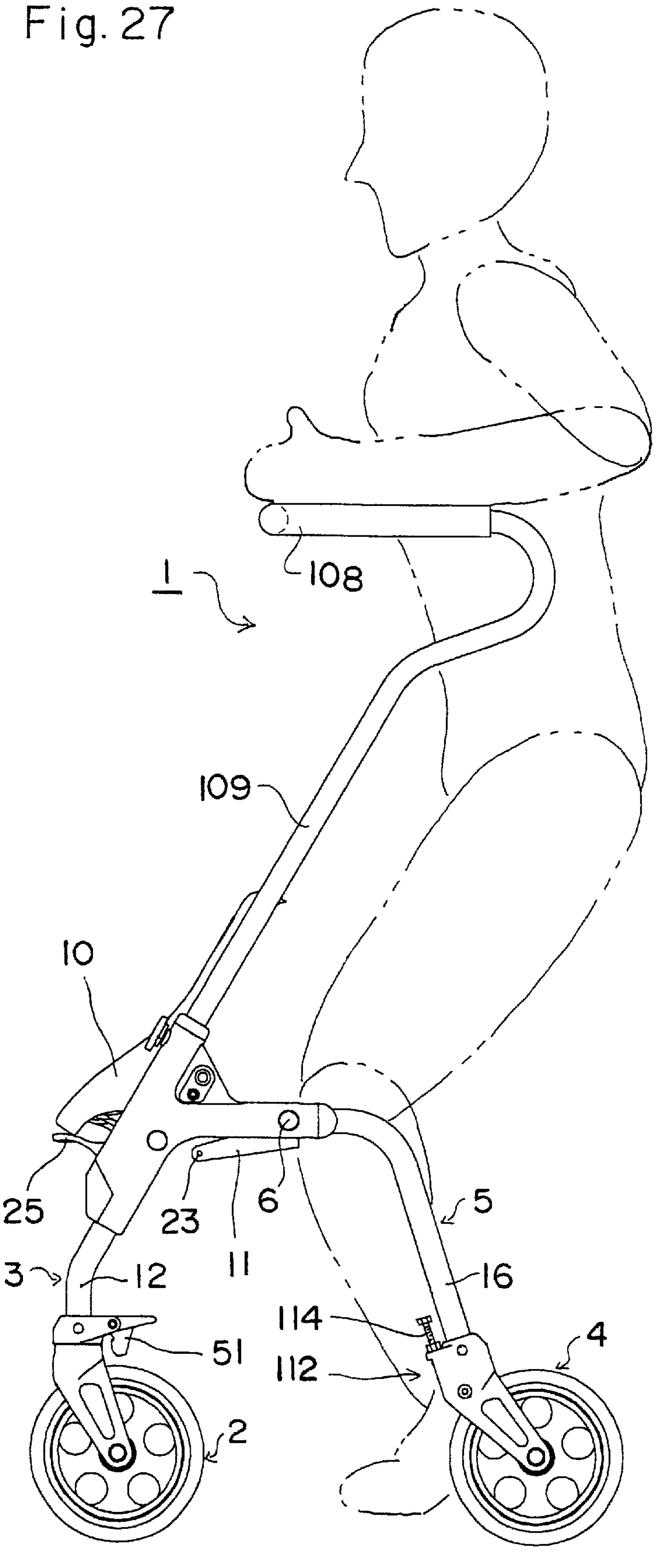
FIG. 27 is a side view showing an embodiment thereof when it is arranged as a walking trainer.

Now will be described a further embodiment of a rolling walker according to the present invention. In FIG. 27, an embodiment in which a rolling walker according to the present invention is used as a walking trainer is shown. In this case, a frame 109 having an armrest portion 108, in place of the handle 7 and the handle support frame 91, is supported in such a manner that the frame 109 is fitted to the outer pipe 90 of the rise and fall portion 15. This armrest portion 108 can be adjusted in height by extending and retracting the frame 109 after the operating screw 92 of the rise and fall portion 15 is loosened.

The rear caster 4 of the walking trainer 1 includes a load mechanism 112 that can always give a load to the rotation of the wheel 37. In this arrangement, the walking trainer 1 is prevented from moving with small force, thereby preventing the walking trainer 1 from moving ahead of the user when the user having disabled feet uses the walking trainer 1, for example, and increasing safety in walking. Also, since a load is constantly given to the wheel 37 so that it would be a good practice for the user to move the walking trainer 1. It is noted that since other members in FIG. 27 are equivalent to those in the previously-described rolling walker 1 and the same numeral references are used, the description of the members are omitted.

Figure 28:
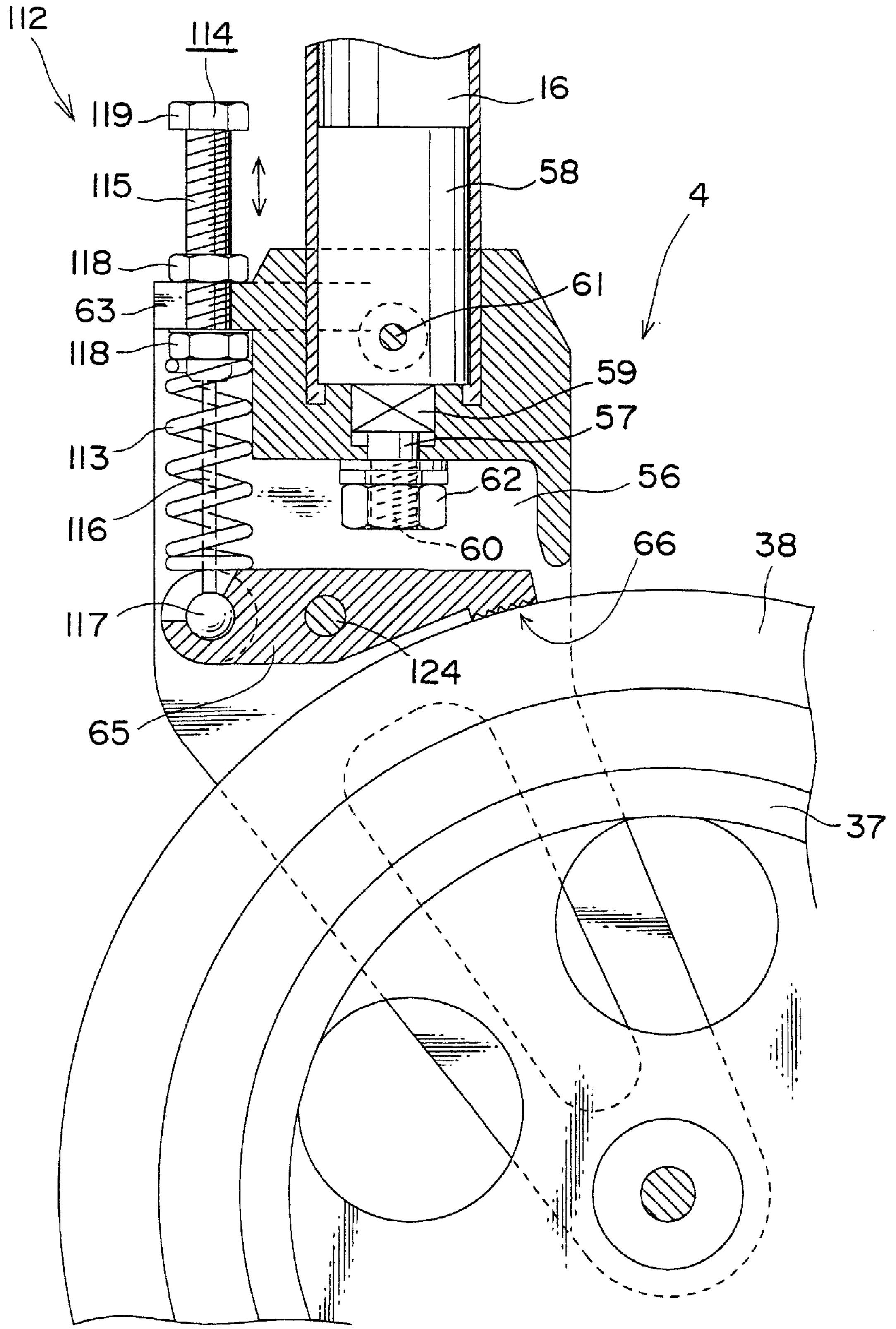
FIG. 28 is a side view of a rear caster thereof when it is arranged as a walking trainer.
Figure 29:
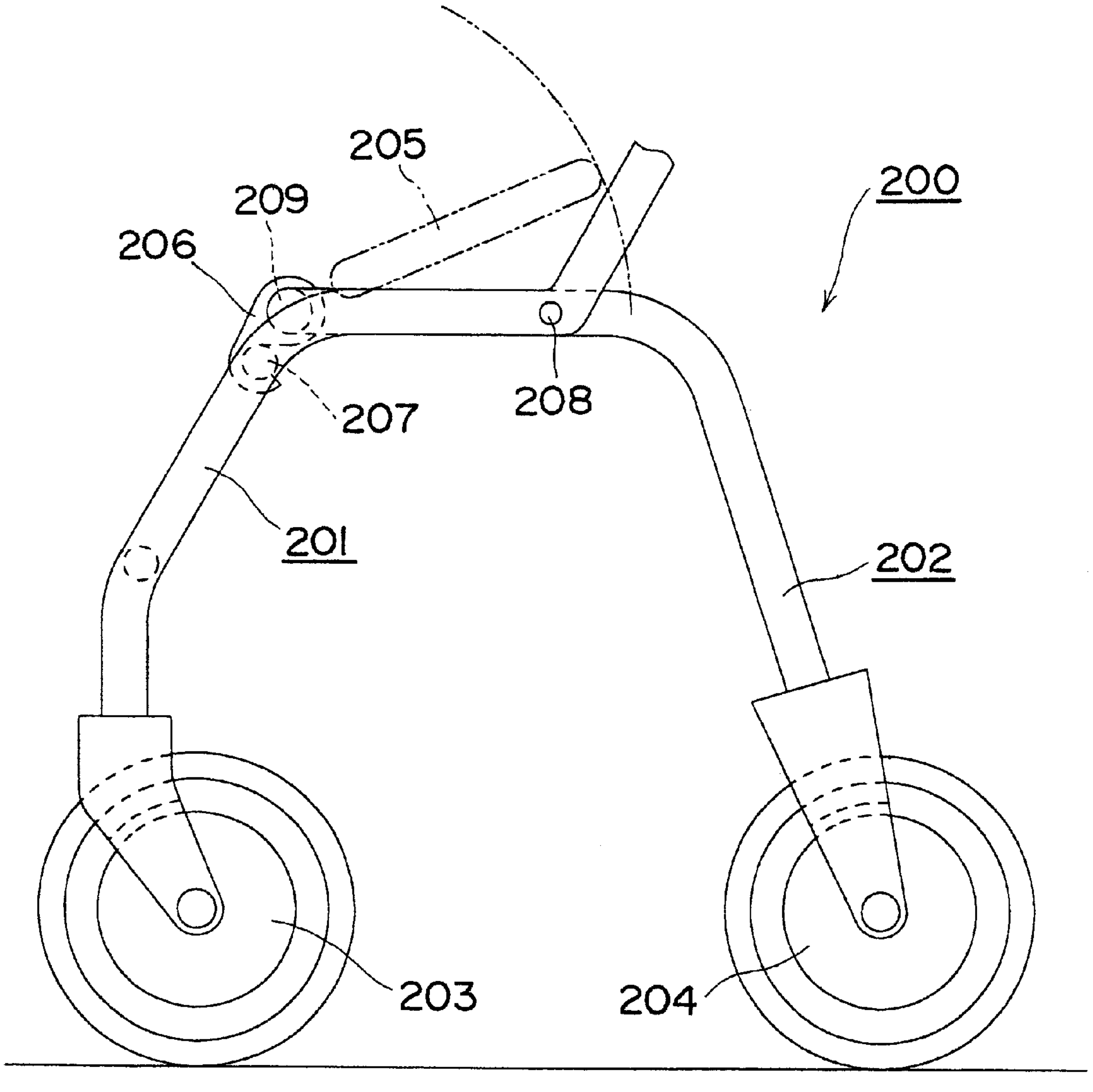
FIG. 29 is a side view of a frame of a prior art rolling walker in an open position.
Figure 30:
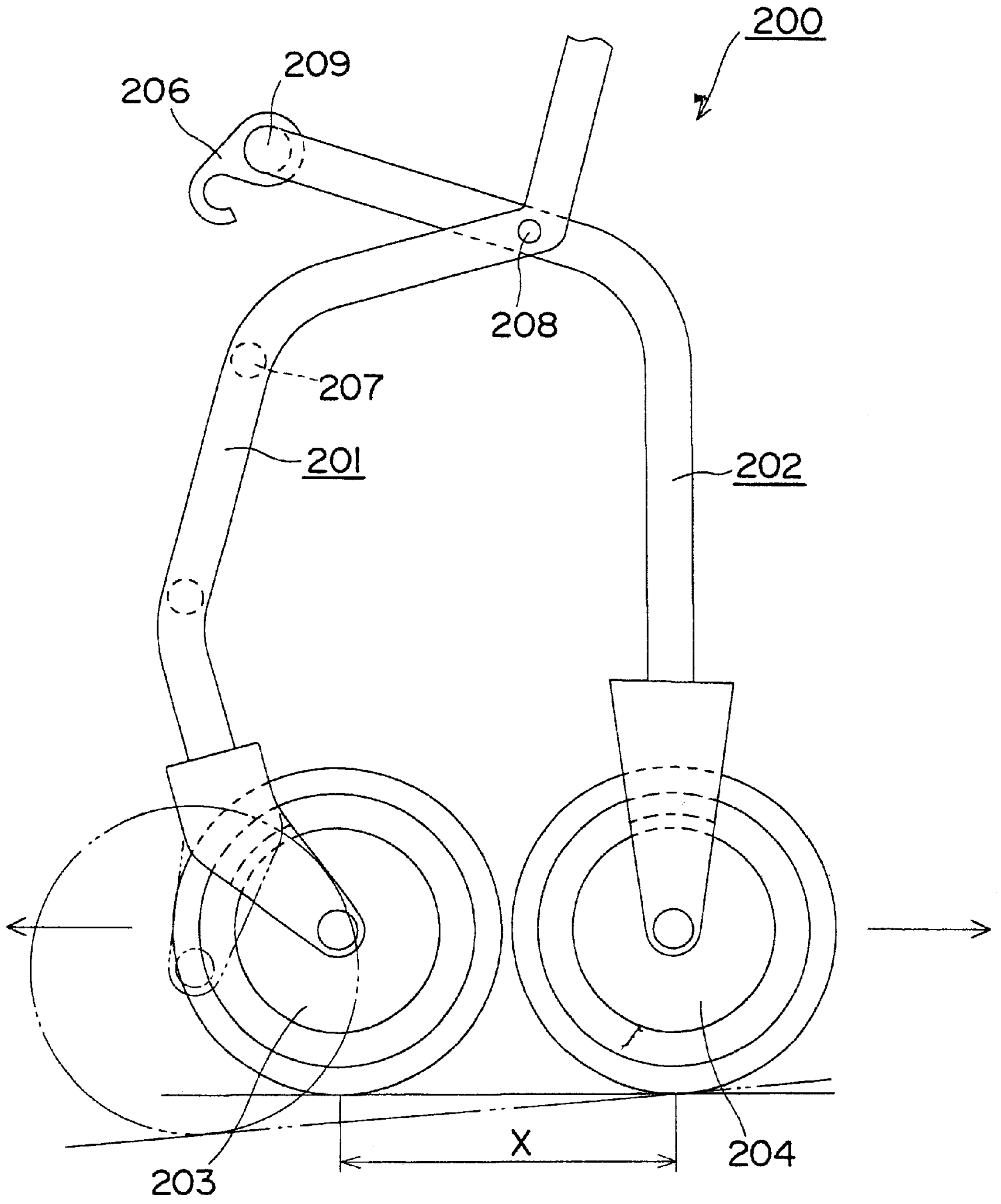
FIG. 30 is a side view of a frame of a prior art rolling walker in a closed position.

The load mechanism 112 includes a brake shoe 65 capable of oscillating with respect to a yoke 56, and a tension giving member 114 disposed at the opposite end portion of a braking face 66 of the brake shoe 65, as shown in FIG. 28. The braking face 66 of the brake shoe 65 is made into an uneven surface. In this arrangement, friction between the tire 38 and the braking face 66 can be large to give a load effectively.

The tension giving member 114 includes a operating portion 119, an adjustment screw portion 115, a wire portion 116 integrally formed with the adjustment screw portion 115, and an engagement ball portion 117 formed at the end of the wire portion 116. The adjustment screw portion 115 is screwed at a attachment portion 63 of the yoke 56 with a nut 118 so as to adjust the position. Also, the engagement ball portion 117 is engaged with the brake shoe 65 so that the tension giving member 114 can always give tension to the brake shoe 65, thereby always producing a load to move the walking trainer 1.

Tension of the wire portion 116 can be controlled by adjusting the position of the tension giving member 114 in the longitudinal direction by means of operating the operating portion 119 and the adjustment screw portion 115. In this manner, tension to the brake shoe 65 is changed to adjust pressing force, i.e., volume of a load to the tire 38 from the braking face 66. And, pressing force to the tire 38 from the braking face 66 can be removed by considerably loosening the tension giving member 114.

Further, in this embodiment, an impetus giving spring 113 is provided around the wire 116. This impetus giving spring 113 consists of, for example, a helical compression spring, and gives impetus in the direction to which the braking face 66 of the brake shoe 65 separates from the tire 38. In this manner, the braking face 66 can be kept as being separated from the tire 38 when the tension giving member 114 is moved to the brake shoe 65 side to loosen the wire portion 116 and the brake shoe 65 becomes not to give a load to the tire 38, thereby preventing the brake shoe 65 from becoming free.

Furthermore, the operating portion 119 is adapted to consist of a head portion of the bolt. In this arrangement, the operating portion 119 does not easily rotate so that it can be prevented from changing a load volume by hitting a user's foot to the operating portion 119.

According to the load mechanism 112, the tension giving member 114 can make the braking face 66 of the brake shoe 65 press the tire 38 constantly so that the a load can be given to the movement of the walking trainer 1. A volume of the load can be adjusted by controlling the operating portion 119 and a nut 118, and the most suitable load can be given according to walking ability of a user or the extent of training, for example.

In the embodiment shown in FIG. 28, although the operating portion 119 is consisting of a head of the bolt, the present invention is not restricted to this example and an operation lever is possible. In this case, the nut 118 is fixed to the attachment portion 63. Also, in order to prevent a user's foot from hitting the operation lever, the free end of the operation lever is set to face, e.g. outside the walking trainer. An operating portion according to this embodiment can easily adjust the volume of a load, thereby attaining excellent operational condition:

Although the above description has been given as to a preferred embodiment, this is not restricted thereto and various modifications are possible within a true scope of the present invention. It may be possible, for example, that the engagement mechanism 18 of the closed frame flexing means 11 which fixes frames in a closed position is attached to the second frame 5 and the arm 19 is attached to the first frame 3. In this case, the frames 3 and 5 can be kept in a closed position by an engagement of the engagement mechanism 18 with the arm 19.

And, it may be possible for the closed frame fixing means 11 which fixes frames in a closed position to have a pawl portion 97 that is fixed to the upper portion of one of the longitudinal pipe portions 16 of the second frame 5 and is able to engage with the lateral pipe portion 13 of the first frame 3 when each of the frames 3 and 5 is closed. In this case, the pawl portion 97 of the closed frame fixing means 11 which fixes frames in a closed position fixed to the second frame 5 engages with the lock pipe portion 13 of the first frame 3 when each of the frames 3 and 5 is closed, so that the frames 3 and 5 can be kept being folded.

Figure 21:
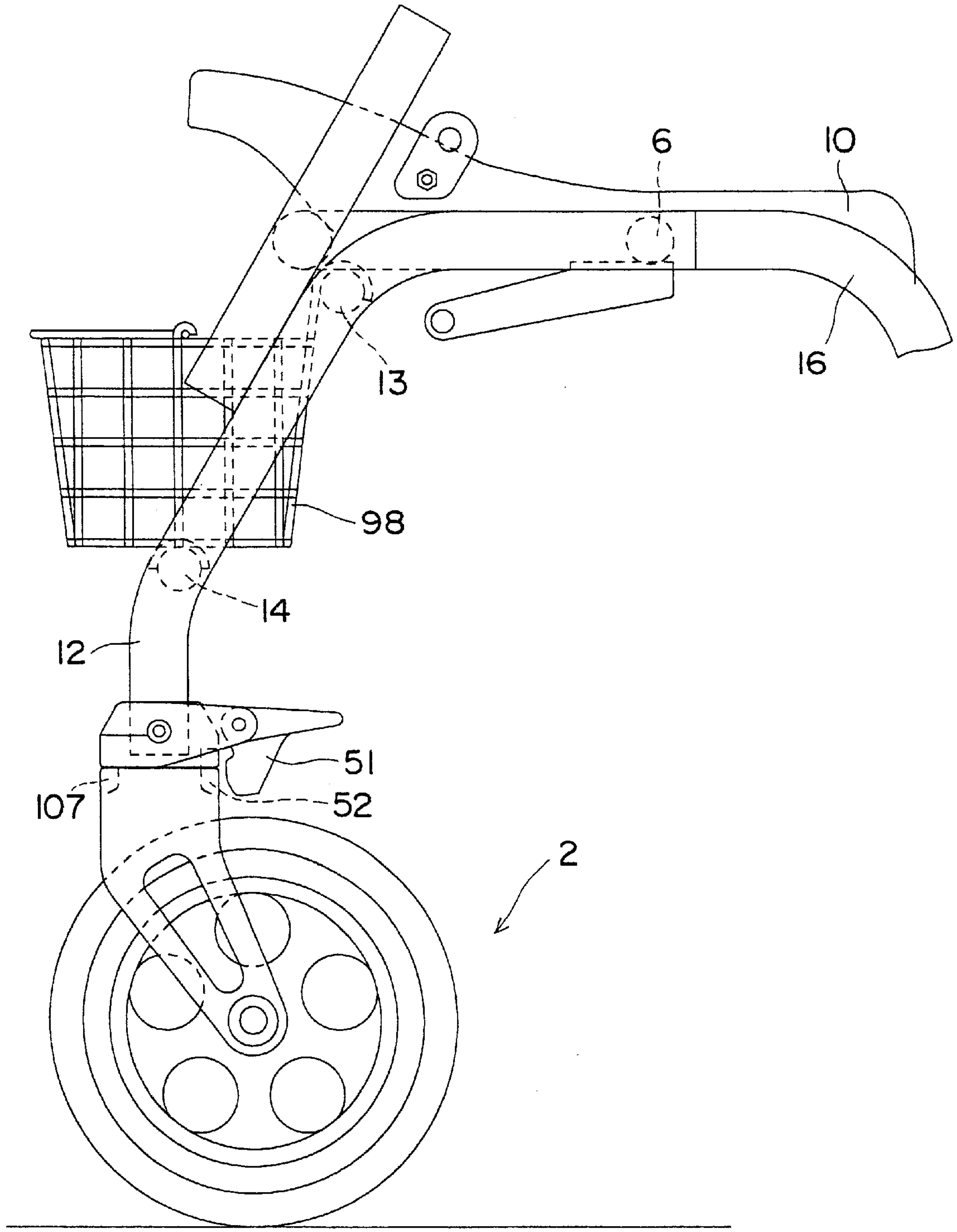
FIG. 21 is a side view of a basket thereof.

Further, a wire basket 98 may be detachably attached to the first frame 3 in place of the detachable bag 94, as shown FIG. 21. In this case, a user can carry his or her things or the like in the basket 98 and the basket can be removed for carrying by the user. The basket 98 is removably assembled into, e.g. the lateral pipe portions 13 and 14 of the first frame. In the above-described embodiment, the bag 94 or the basket 98 is detachably attached, but the present invention is not restricted to this example and the bag 94 or the basket 98 can be unremovably attached to the rolling walker 1.

Furthermore, although the back belt 8 is adapted to vary in length due to using the connecting member 71, the present invention is not restricted to this example and it is possible that the back belt 8, the connecting member 71 and the handle cover 70 are integrally assembled so that they cannot be adjusted in length. In this case, shapes of the assemblies or the like can be simplified.

In the above-described embodiment, the rolling walker 1 can fold to stand by using the closed frame fixing means 11 which fixes frames in a closed position together with the means 34 for fixing front casters in the opposite direction. The present invention, however, is not restricted to this example, and the rolling walker 1 can stand only with the closed frame fixing means 11 which fixes frames in a closed position where each frame 3, 5 does not open freely and the gravity center of the rolling walker 1 exists between the front caster 2 and the rear caster 4 when the rolling walker 1 is folded.

In addition, in the above-described embodiment, members in the front caster 2 and the rear caster 4 are separately formed to be a respective assembly except the wheel 37 and the tire 38. However, the present invention is not restricted to this example, part of the members except the wheel 37 and the tire 38 may be used for both the front and the rear casters 2 and 4.

Namely, the front caster 2 and the rear caster 4 are adapted to have the main portion of the caster 35 and the connecting portion 36. The connecting portion 36 has either a caster rotating means 41, 42 rotatably supporting the main portion of the caster 35 or a caster fixing means 99, 57 unrotatably supporting the main portion of the caster 35. In this embodiment, the front caster 2 is provided with the caster rotating means 41, 42 to be a rotatable caster, while the rear caster 4 is provided with the caster fixing means 99, 57 not to be rotatable caster.

In this arrangement, the main portion of the caster 35 can be used for both the front caster 2 having the caster rotating means 41, 42 and the rear caster 4 having the caster fixing means 99, 57, additionally members except the caster rotating means 41, 42 of the connecting portion 36 and the caster fixing means 99, 57, i.e. the base cap 40 are also used for both the front caster 2 and the rear caster 4. Thus, the number of kinds of necessary assemblies can be decreased and assembly expenses can be cut.

Figure 24:
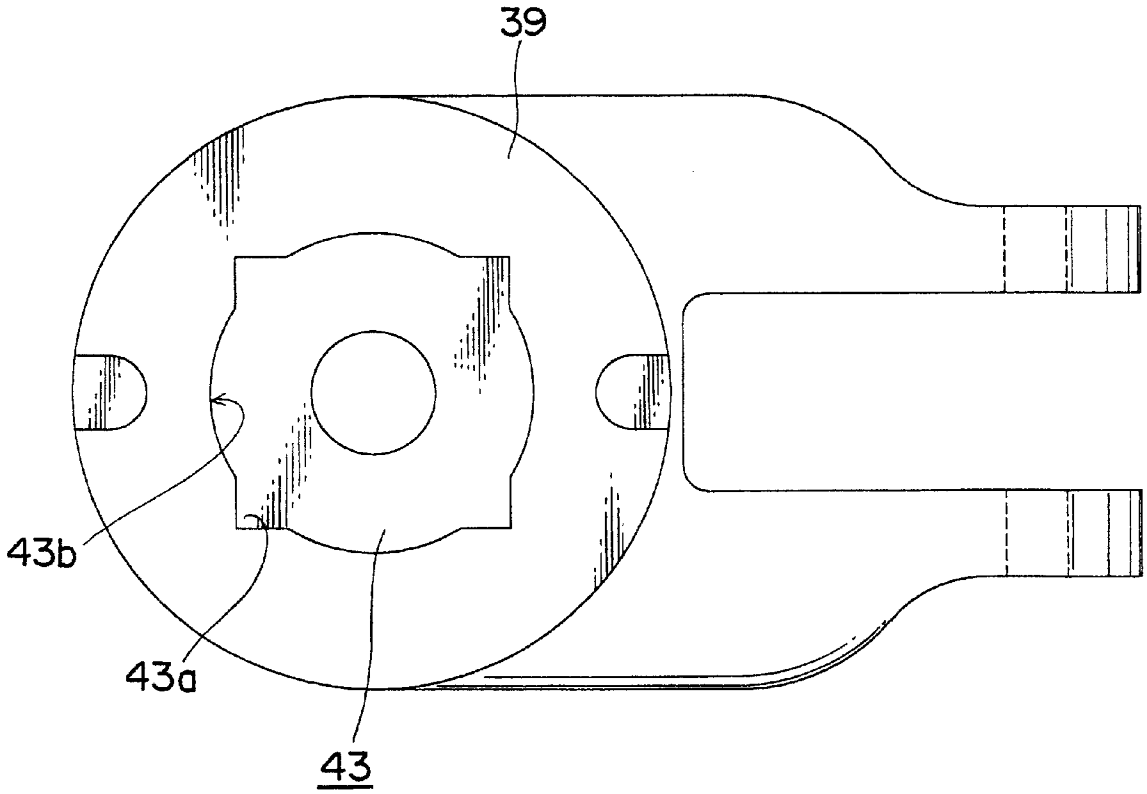
FIG. 24 is a plan view showing another embodiment of a yoke thereof.
Figure 25:
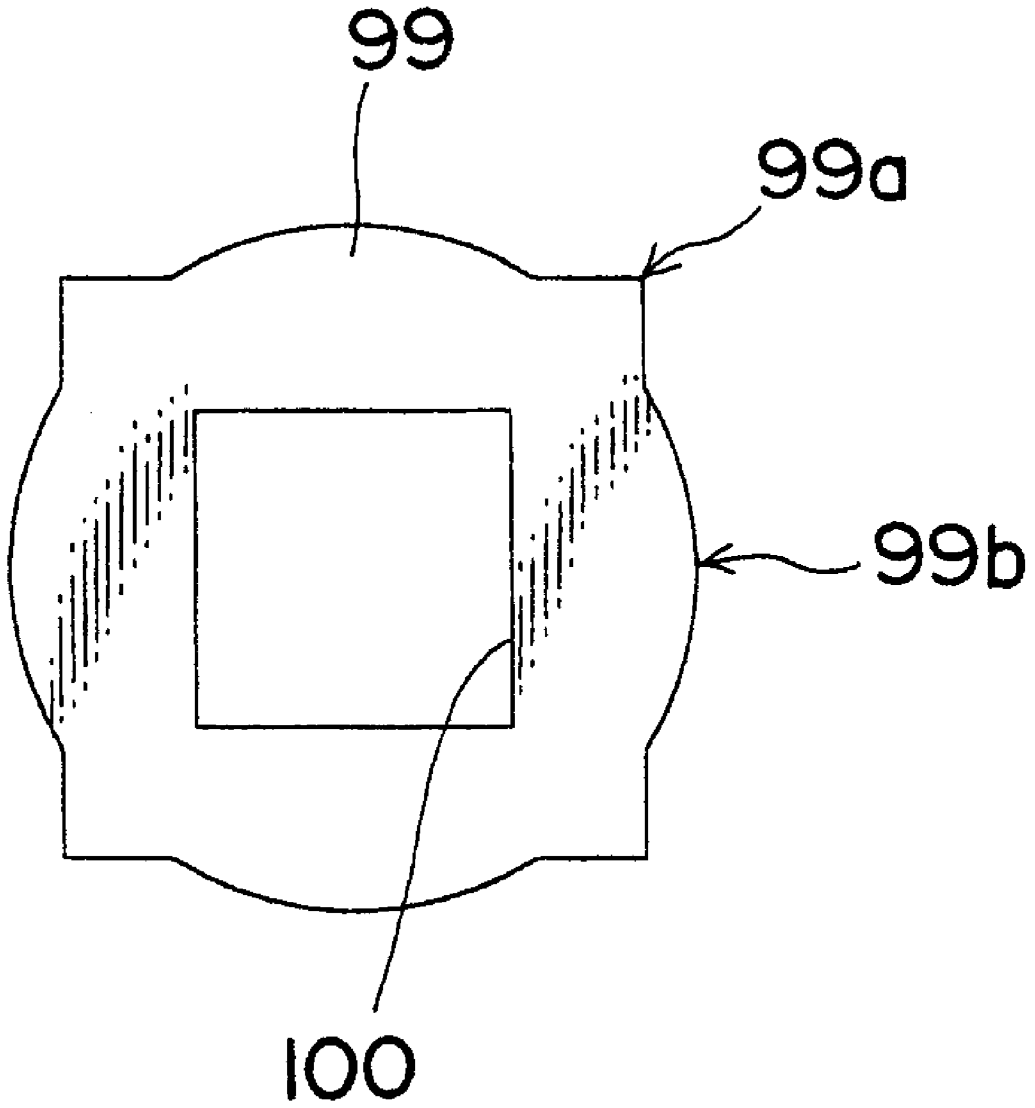
FIG. 25 is a plan view of a collar thereof.

Since the main portion of the caster 35 is connected to each of the frames 3 and 5 through the connecting portions 36, the main portion of the caster 35 can be used for both the front caster 2 and the rear caster 4. In the upper portion of the yoke 39, a fitting hole 43 is formed for disposing the connecting portion 36, as shown in FIG. 24. The fitting hole 43 has such a configuration that a circle and a square are concentrically overlap so as to have each corner 43*a* of the square being protruding from the circular hole portion 43*b*, as shown in FIG. 24.

Figure 22:
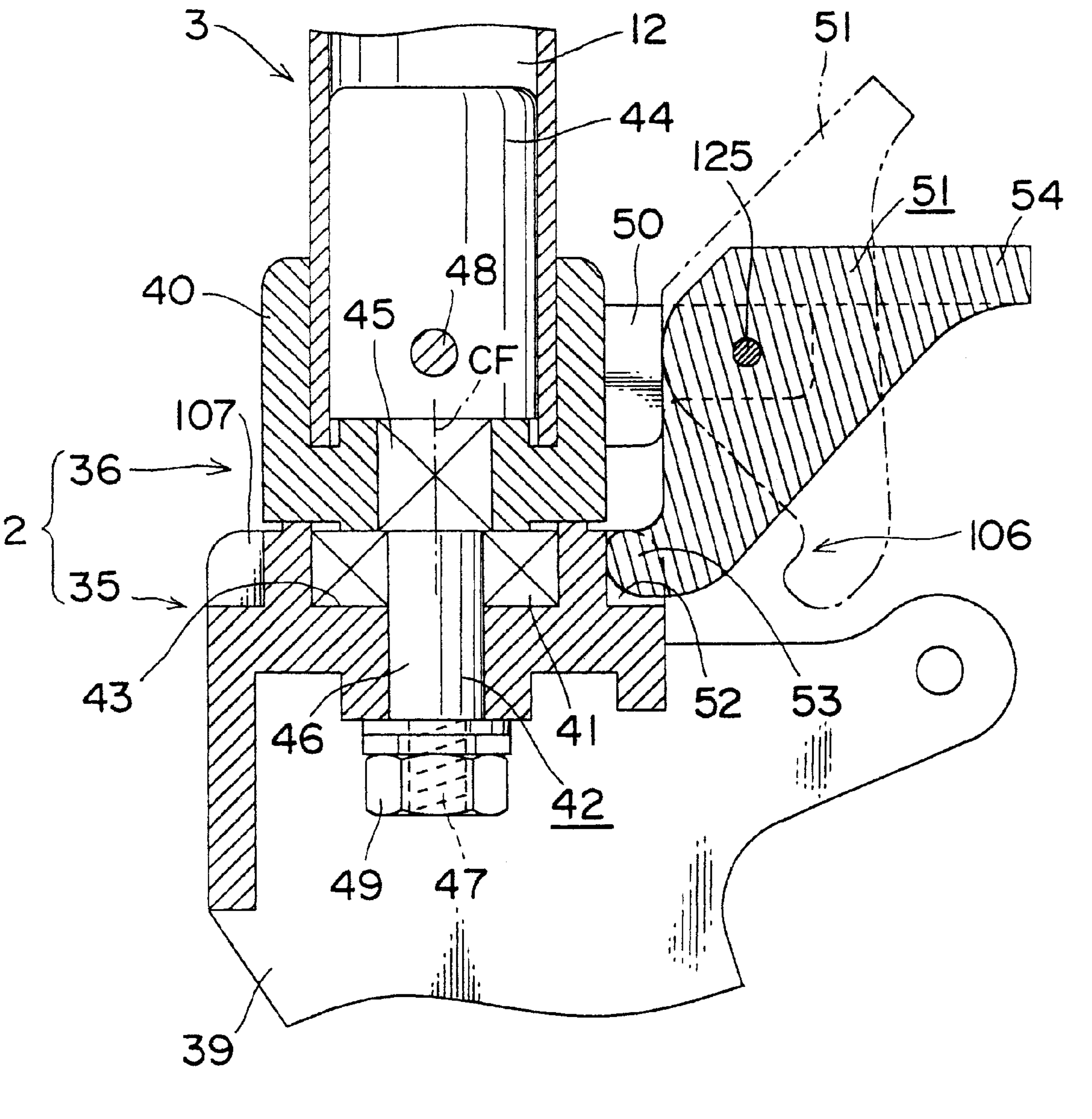
FIG. 22 is a side view showing another embodiment of a front caster thereof.

As shown in FIG. 22, the connecting portion 36 of the front caster 2 includes a base cap 40 fitted to and fixed to the bottom portion of the longitudinal pipe portion 12, and a bearing 41 and a turn bolt 42 for a caster rotating means enabling the main portion of the caster 35 to rotate around the first frame 3. The base cap 40 is also used for a connecting portion 36 of the rear caster 4.

The connecting portion 36 has a attachment portion 50 that can be attached with the locking member 51 to lock a rotation of the caster rotating means 41, 42 when the connecting portion 36 has the caster rotating means 41, 42 and also can be attached with a control cable 64 included in the brake mechanism 120 when the connecting portion 36 has the caster fixing means 99, 57. In this embodiment, the locking member 51 is attached to the attachment portion 50 of the connecting portion 36 of the front caster 2, and the control cable 64 is attached to the attachment portion 50 of the connecting portion 36 of the rear caster 4. Because of this arrangement, the attachment portion 50 can be used for the front caster 2 and the rear caster 4 to be attached with respective members to each caster 2, 4, thereby utilizing a member for another purpose and giving specific functions to each caster 2 and 4. It is noted that since other members of the front caster 2 are the same as those in the above-described embodiment shown in FIG. 11 with respect to the arrangement, the numerical references and their descriptions are omitted.

Figure 23:
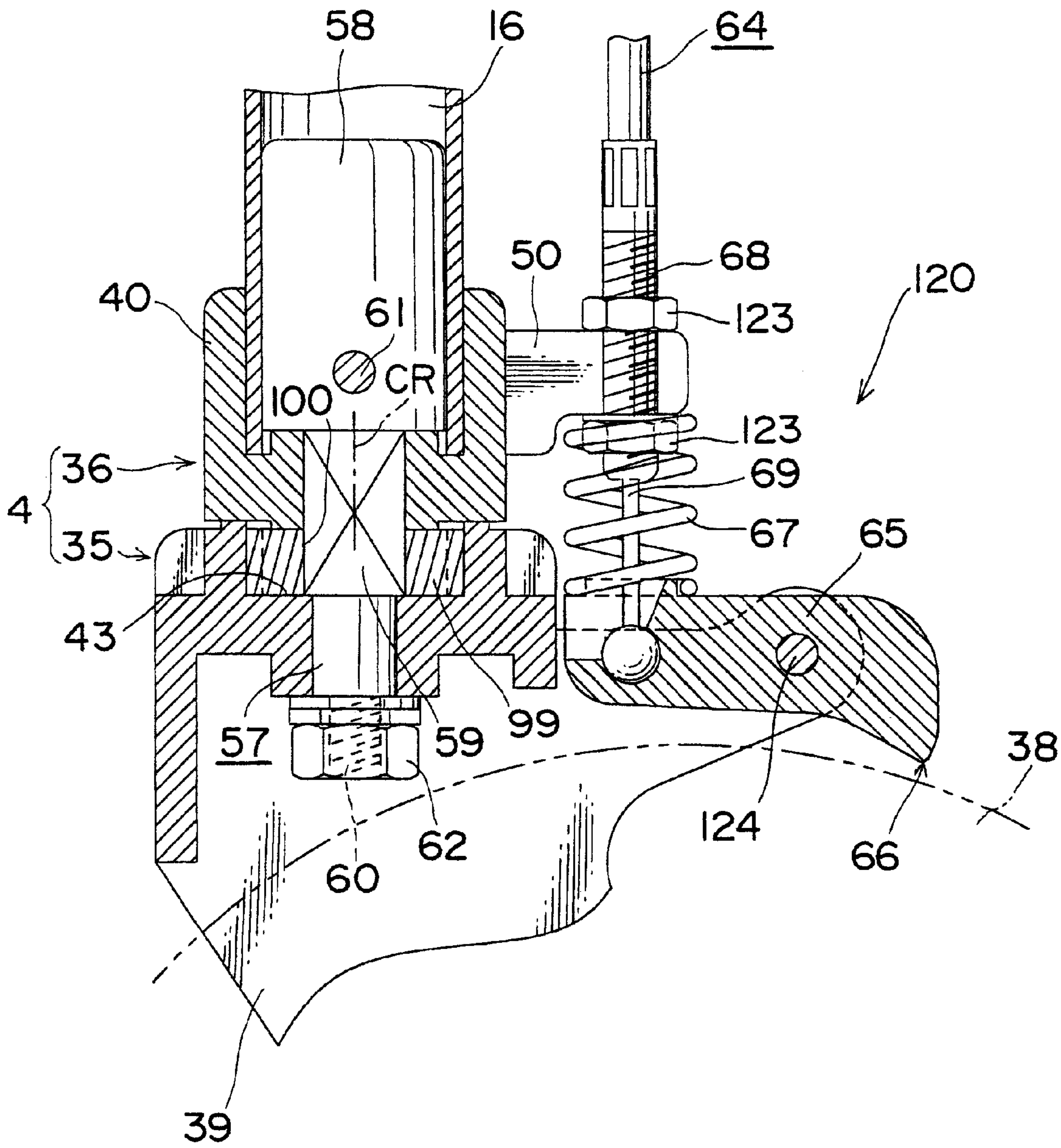
FIG. 23 is a side view showing another embodiment of a rear caster thereof.

As shown in FIG. 23, the connecting portion 36 of the rear caster 4 includes a base cap 40 fitted to the bottom portion of the second frame 5 and fixed thereto, and a collar 99 and a lock bolt 57 as a caster fixing means for unrotatably fixing the main portion of the caster 35 to the second frame 5 in the back and front direction. The collar 99 has corner portions 99*a* and circular partial portions 99*b*, and the collar 99 is equivalent to the fitting hole 43 in shape and size for fixing in the fitting hole 43. In this arrangement, the collar 99 is unrotatably fixed to the yoke 39 by catching the corner portion 99*a* of the collar 99 with of the corner portion 43*a* of the fitting hole 43. In the center of the collar 99, there is formed a fixing hole 100 consisting of a through-hole having a square cross-section. Since the rotating lock portion 59 of the lock bolt 57 is fitted to the fixing hole 100, the collar 99 and the lock bolt 57 cannot rotate each other.

The lock bolt 57 is secured to the longitudinal pipe portion 16 with the fixing screw 61, and pierced through the base cap 40, collar 99 and the yoke 39 to be screwed with the nut 62. Since the collar 99 is fixed so as not to rotate with respect to neither the yoke 39 nor the lock bolt 57, the main portion of the caster 35 is unrotatably secured to the second frame 5.

Further, an outer casing 68 of the control cable 64 is screwed to the attachment portion 50 of the base cap 40. A brake shoe 65 is rotatably attached to the yoke 39 of the main portion of the caster 35. It is noted that other members of the rear caster 4 in this embodiment are equivalent in arrangement to those in the above-described embodiment shown in FIG. 12, and the numerical references and the descriptions are omitted.

Although descriptions have been made in the above-described embodiments where the front caster 2 and the rear caster 4 have a single wheel respectively, the present invention is not restricted to this example and a twin-wheel arrangement may be employed. In this case, stability in straight moving can be attained.

On the other hand, in the above-described embodiment, the operation lever 79 can be locked when it is pushed down. However, the present invention is not restricted to this example and the operation lever 79 may be adapted to be locked when it is pulled up. In this manner, the operational direction to lock the operation lever 79 can be defined according to the operational nature of the device using the brake operation device 9, thereby obtaining good operational performance.

In each of the above-described embodiments, the operating screw 92 is pierced through the inner pipe 91 at the rise and fall portion 15 of the first frame 3. However, the present invention is not restricted to this example, and the operating screw 92 may press the outer surface of the inner pipe 91 without being pierced therethrough. In this case, it is preferable for a groove to be curved toward the longitudinal direction in order to prevent the inner pipe 91 from rotating with respect to the outer pipe 90. According to the rise and fall portion 15, the height of the inner pipe 91 can be adjusted at any place thereof. When the height adjustment is not needed, the handle support frame 91 can be integrally formed with the first frame 3 or the second frame 5.

What is claimed is:

1. A rolling walker comprising:

a first frame supported by a front caster at both ends thereof and a second frame supported by an unrotatable rear caster at both ends thereof, the first frame and the second frame being foldably connected with each other by a connecting shaft;

a handle provided to either the first frame or the second frame; and a straight moving means enabling the front caster to be fixed in a back and front direction of the rolling walker, the straight moving means comprising fixing means for fixing the front caster in an opposite direction, the fixing means can fix the front caster after rotating to a position where a center of a wheel of the front caster is positioned ahead of a rotational axis of the front caster, wherein the rolling walker has a closed frame fixing means, the means fixing the first frame and the second frame in a closed position and connecting the first frame with the second frame when the first frame and the second frame are rotationally folded around the connecting shaft to a closed position.

2. A rolling walker according to claim 1, wherein the straight moving means includes: a lock member movably attached to the first frame; and a locking recess formed in both the first frame and the front caster to be over engaged with the lock member to restrict rotation of the front caster.

3. A rolling walker according to claim 1, wherein the front caster and the rear caster each have a main portion of the caster and a connecting portion for connecting the main portion of the caster with the frame, and the connecting portion has either a caster rotating means which rotates the main portion of the caster with respect to the frame or a caster fixing means which non-rotatably fixes the main portion of the caster with respect to the frame.

4. A rolling walker according to claim 3, wherein the connecting portion has an attached portion which can be attached with a locking member for locking rotation when the connecting portion has the caster rotating means and with a brake mechanism when the connecting portion has the caster fixing means.

5. A rolling walker according to claim 1, wherein the rolling walker is adapted for use as a walking trainer by providing an armrest to the frame having the handle.

6. A rolling walker according to claim 5, wherein the rear caster of the walking trainer has a load mechanism for providing a load against the rotation of a wheel of one of the front and rear casters.

7. A rolling walker comprising:

a first frame supported by a front caster at both ends thereof and a second frame supported by a rear caster at both ends thereof, the first frame and the second frame being foldably connected with each other by a connecting shaft;

a handle provided to either the first frame or the second frame; and a seat facing backward, the seat being rotatably supported on a lateral pipe portion of a frame defined as front frame during walking, and the seat is rotatable between a sitting position and an evacuated position;

wherein the rolling walker has a closed frame fixing means, the means fixing the first frame and the second frame in a closed position and connecting the first frame with the second frame when the first frame and the second frame are rotationally folded around the connecting shaft to a closed position.

8. A rolling walker according to claim 7, wherein the rolling walker includes an open frame fixing means, the open frame fixing means fixes the first frame and the second frame in an open position, and the open frame fixing means can connect the first frame and the second frame to fix positional relations therebetween when the first frame and the second frame are in an open position.

9. A rolling walker according to claim 8, wherein the open frame fixing means is provided under the seat and has a release lever rotatable between a position where the release lever extends from the seat and the open frame fixing means can be operated and a position where the release lever is not interfered with the seat when the seat is pulled up to the evacuated position.

10. A rolling walker according to claim 8, wherein the handle is provided on the right and left sides respectively, front portions of the right and left handles are connected to each other through a back belt, and the back belt against which a user can sit on the seat with their back is provided to the handles.

11. A rolling walker according to claim 10, wherein a center portion of the back belt is longer in width than other portions thereof.

12. A rolling walker according to claim 7, wherein a circumferential portion of the seat surrounding a user's hip is raised higher than a sitting portion of the seat.

13. A rolling walker according to claim 7, wherein a bag is detachably attached to at least one of the first and second frames.

14. A rolling walker according to claim 13, wherein the rolling walker has a seat rotatably supported on a lateral pipe portion of a frame defined as a rear frame when the rolling walker is moving, the seat being rotatably between a position where a user can sit and a position where the seat is evacuated, the seat forming a lid of the bag.

15. A rolling walker comprising:

a first frame supported by a front caster at both ends thereof and a second frame supported by a rear caster at both ends thereof, the first frame and the second frame being foldably connected with each other by a connecting shaft; and a handle provided to either the first frame or the second frame; and a seat facing front rotatably supported by the second frame whereby a front portion of the seat can be pulled up;

wherein the rolling walker has a closed frame fixing means, the means fixing the first frame and the second frame in a closed position and connecting the first frame with the second frame, so that the rolling walker can stand independently when the first frame and the second frame are rotationally folded around the connecting shaft to a closed position.

16. A rolling walker according to claim 15, wherein a circumferential portion of the seat surrounding a user's hip is raised higher than a sitting portion of the seat.

17. A rolling walker according to claim 15, wherein the handle comprises a right handle and a left handle connected through the connecting shaft.

18. A rolling walker according to claim 15, wherein a bag is detachably attached to at least one of the first and second frames.

19. A rolling walker according to claim 18, wherein the rolling walker has a seat rotatably supported on a lateral pipe portion of a frame defined as a rear frame when the rolling walker is moving, the seat being rotatably between a position where a user can sit and a position where the seat is evacuated, the seat forming a lid of the bag.

20. A rolling walker according to claim 15, wherein the front caster and the rear caster each have a main portion of the caster and a connecting portion for connecting the main portion of the caster with the frame, and the connecting portion has either a caster rotating means which rotates the main portion of the caster with respect to the frame or a caster fixing means which non-rotatably fixes the main portion of the caster with respect to the frame.

21. A rolling walker according to claim 20, wherein the connecting portion has an attached portion which can be attached with a locking member for locking rotation when the connecting portion has the caster rotating means and with a brake mechanism when the connecting portion has the caster fixing means.

22. A rolling walker comprising:

a first frame supported by a front caster at both ends thereof and a second frame supported by a rear caster at both ends thereof, the first frame and the second frame being foldably connected with each other by a connecting shaft;

a handle provided to either the first frame or the second frame;

a brake mechanism for stopping rotation of a wheel of the caster by pulling a wire;

a brake operation device which can operate the brake mechanism by pulling the wire, the brake operation device having a cam member rotatably supported with respect to the handle and attached with the wire;

a locking mechanism for locking an operation lever after the operation lever has been rotated in a second direction, the operation lever further having a first pressing portion which rotates the cam member in a direction of pulling the wire when operating the operation lever in a first direction; and a second pressing portion which rotates the cam member in a direction of pulling the wire when operating the operation lever in a second direction, and the cam member has a first receiving portion pressed by the first pressing portion of the operation lever and a second receiving portion pressed by the second pressing portion of the operation lever, wherein the operation lever, the cam member and the locking mechanism are disposed so as to stop rotation of the operation lever at three points of the first pressing portion, the second pressing portion and the locking mechanism when the operation lever is in a neutral position;

wherein the rolling walker has a closed frame fixing means, the means fixing the first frame and the second frame in a closed position and connecting the first frame with the second frame, so that the rolling walker can stand independently when the first frame and the second frame are rotationally folded around the connecting shaft to a closed position.

23. A rolling walker according to claim 22, wherein the operation lever has a ring-shaped operation portion.

* * * * *